United States Patent
Okuyama et al.

(10) Patent No.: US 6,628,614 B2
(45) Date of Patent: *Sep. 30, 2003

(54) TRAFFIC CONTROL APPARATUS AND METHOD THEREOF

(75) Inventors: Yuzo Okuyama, Kanagawa (JP); Naotoshi Watanabe, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,061

(22) Filed: Jun. 21, 1999

(65) Prior Publication Data

US 2003/0043796 A1 Mar. 6, 2003

(30) Foreign Application Priority Data

Aug. 4, 1998 (JP) ............................................. 10-220142

(51) Int. Cl.[7] .................................................. H04J 1/16
(52) U.S. Cl. ................. 370/230.1; 370/235; 370/395.1; 370/396
(58) Field of Search .............................. 370/235, 235.1, 370/236, 241, 252, 253, 229, 230, 230.1, 395.1, 396, 398, 395.21, 231–234, 412

(56) References Cited

U.S. PATENT DOCUMENTS

| | | | | |
|---|---|---|---|---|
| 5,432,713 A | * | 7/1995 | Takeo et al. | 340/825.57 |
| 5,465,348 A | * | 11/1995 | Amemiya et al. | 370/235 |
| 5,568,468 A | * | 10/1996 | Ogasawara et al. | 370/230 |
| 5,661,722 A | * | 8/1997 | Miyagi | 370/235 |
| 5,666,353 A | * | 9/1997 | Klausmeier et al. | 370/230 |
| 5,793,747 A | * | 8/1998 | Kline | 370/230 |
| 5,854,783 A | * | 12/1998 | Kaganoi | 370/232 |
| 6,032,272 A | * | 2/2000 | Soirinsuo et al. | 714/706 |
| 6,108,302 A | * | 8/2000 | Murase | 370/230 |
| 6,304,551 B1 | * | 10/2001 | Ramamurthy et al. | 370/232 |

FOREIGN PATENT DOCUMENTS

| | | |
|---|---|---|
| EP | 756 435 | 1/1997 |
| JP | 8-237265 | 9/1996 |
| JP | 8-237268 | 9/1996 |

* cited by examiner

Primary Examiner—Dang Ton
Assistant Examiner—Phuc Tran
(74) Attorney, Agent, or Firm—Katten Muchin Zavis Rosenman

(57) ABSTRACT

A UPC process unit judges whether an arrived cell conforms to a declared parameter. When receiving a cell which is transmitted by a GFR service, a frame process unit modifies the judgment result of the UPC process unit taking an AAL5 frame into consideration. A cell process unit discards the arrived cell based on the judgment result of the UPC process unit or the modified result.

10 Claims, 16 Drawing Sheets

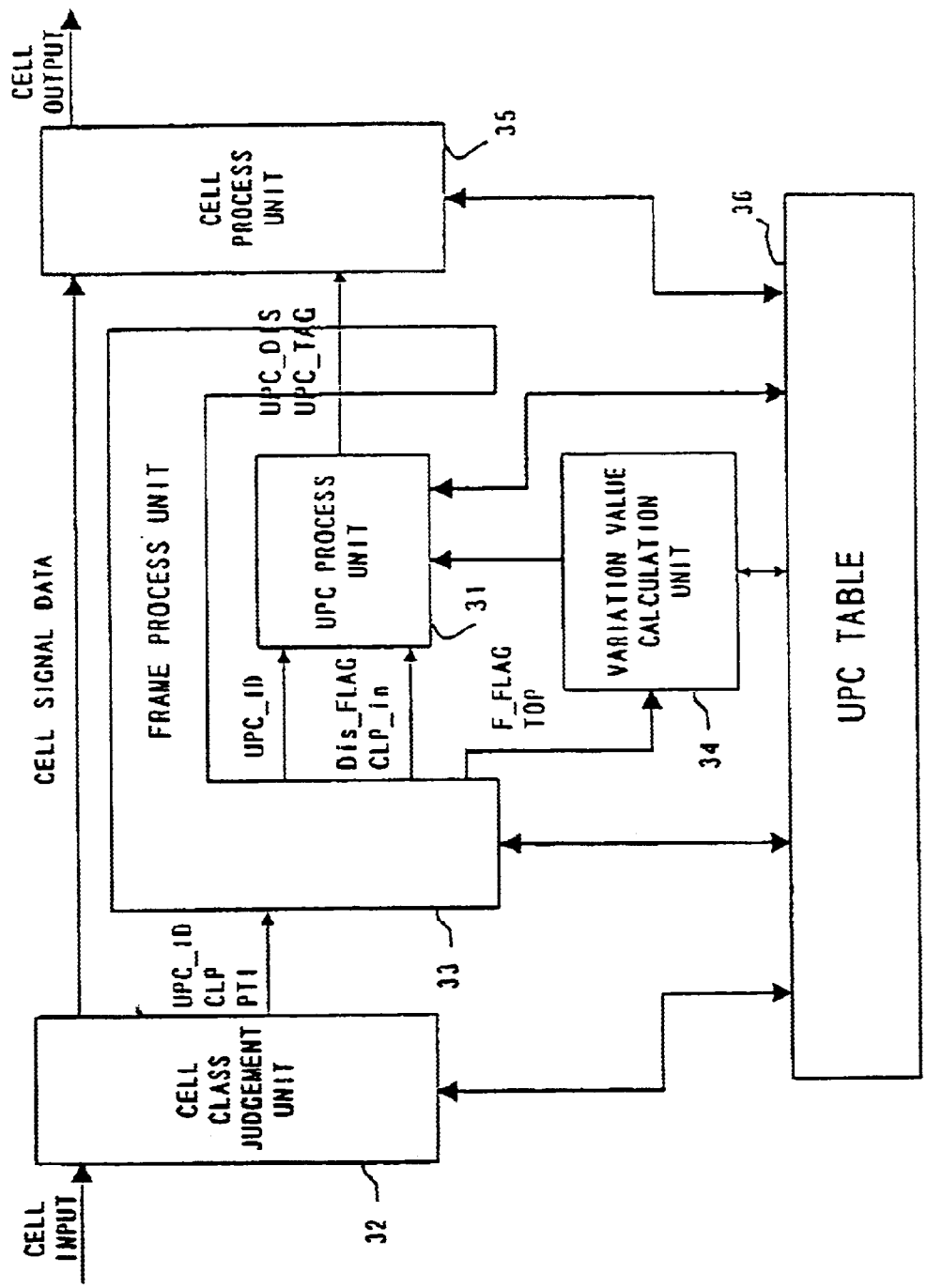
F I G. 5

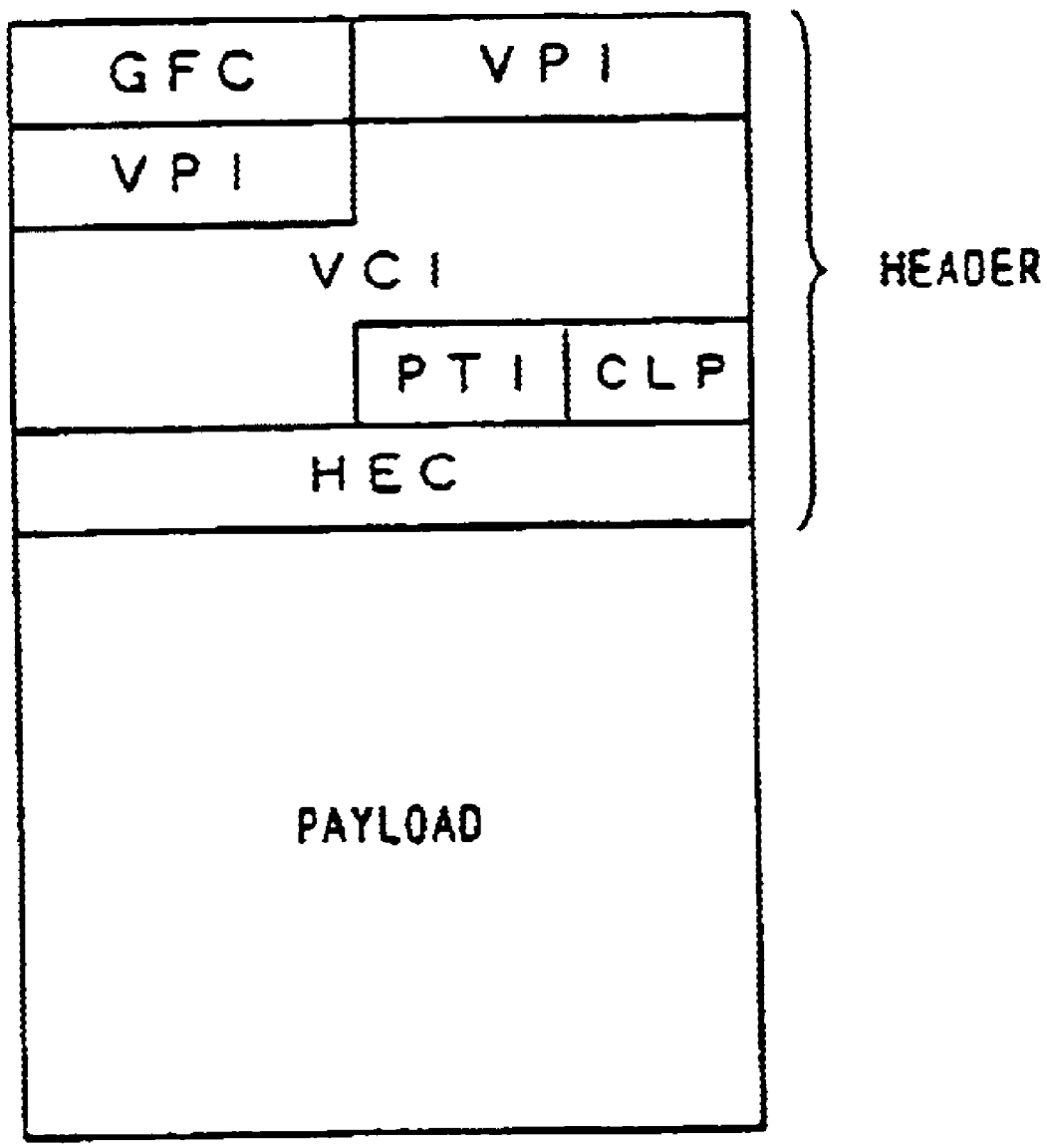
F I G. 7

VPI/VCI

```
PARAMETER

PCR(MAXIMUM CELL RATE)
SCR(AVERAGE CELL RATE)
MCR(MINIMUM CELL RATE)
CDVT(CELL DELAY VARIATION TIME)
MBS(MAXIMUM BURST SIZE)

UPC_ID(CONNECTION IDENTIFIER FOR UPC PROCESS)
UPC_EN(INSTRUCTION ON UPC OPERATION)···ON=EXECUTION OF UPC
TOF(INDICATION OF TOP OF FRAME)···true=TOP-OF-FRAME CELL
EN_frame(INSTRUCTION ON FRAME UNIT PROCESS)···true=EXECUTION OF FRAME PROCESS
PTI
EOF(INDICATION OF END OF FRAME)···true=END-OF-FRAME CELL
F_FLAG(FLAG FOR OPERATION OF FRAME UNIT)···true=INSTRUCTION ON FRAME PROCESS
P_Dis(INDICATION OF PARTIAL DISCARD)···true=DISCARD
P_Tag(INDICATION OF PARTIAL TAGGING)···true=TAGGING
W_Dis(INDICATION OF DISCARD IN WHOLE)···true=DISCARD
W_Tag(INDICATION OF TAGGING IN WHOLE)···true=TAGGING
CLP_in
DIS_FLAG(INSTRUCTION OF COMPULSORY DISCARD)···true=COMPULSORY DISCARD
var_L(VARIABLE FOR UPC PROCESS)
UPC_DIS(INSTRUCTION OF DISCARD)···true=DISCARD
UPC_TAG(INSTRUCTION OF TAGGING)···true=EXECUTION OF TAGGING

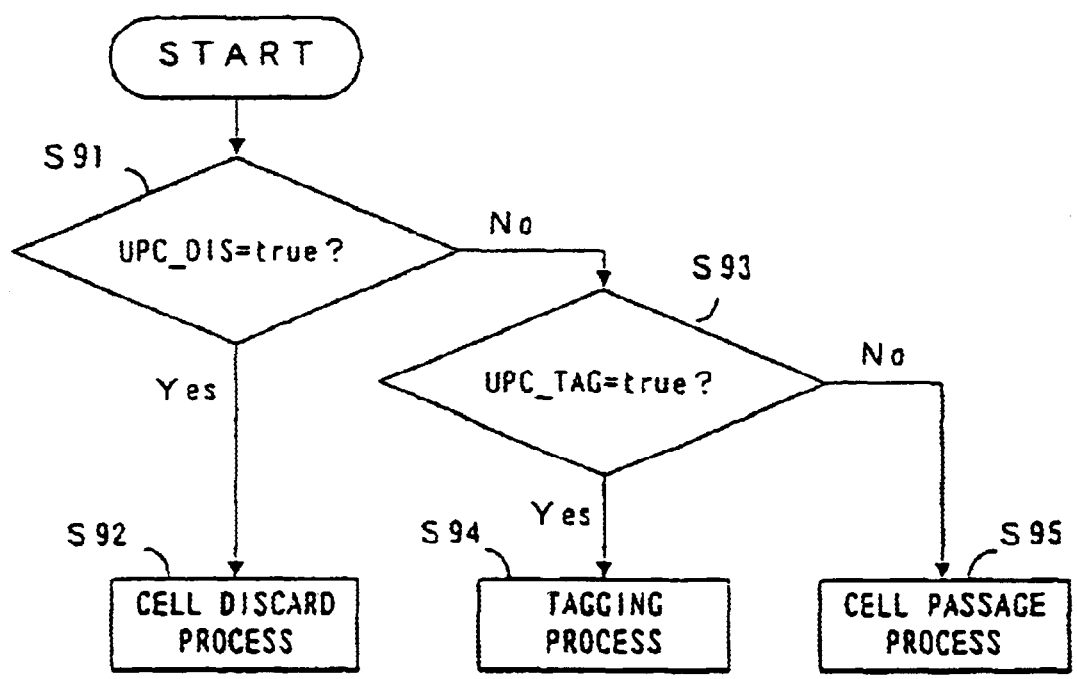
F I G. 1 3

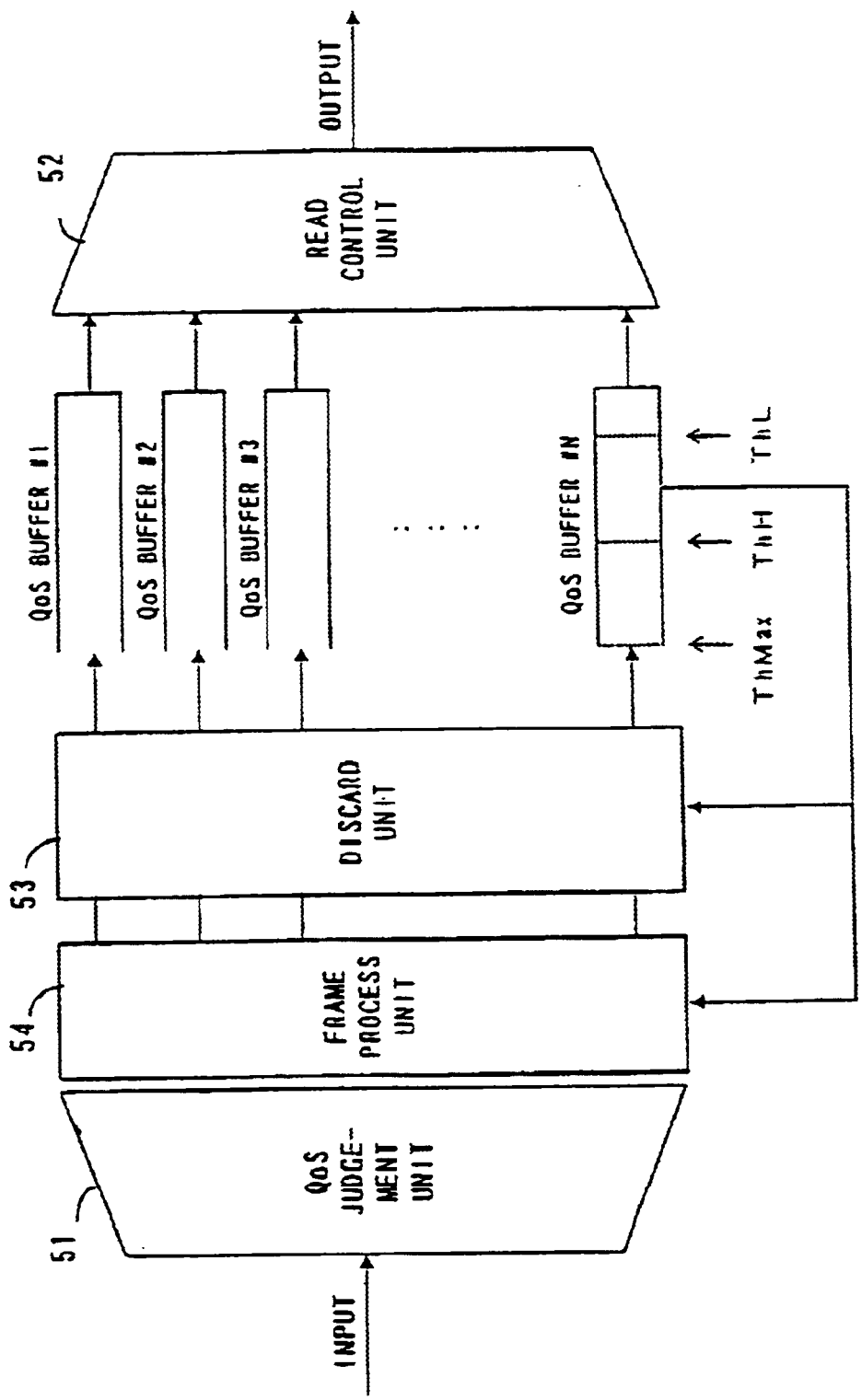
F I G. 15

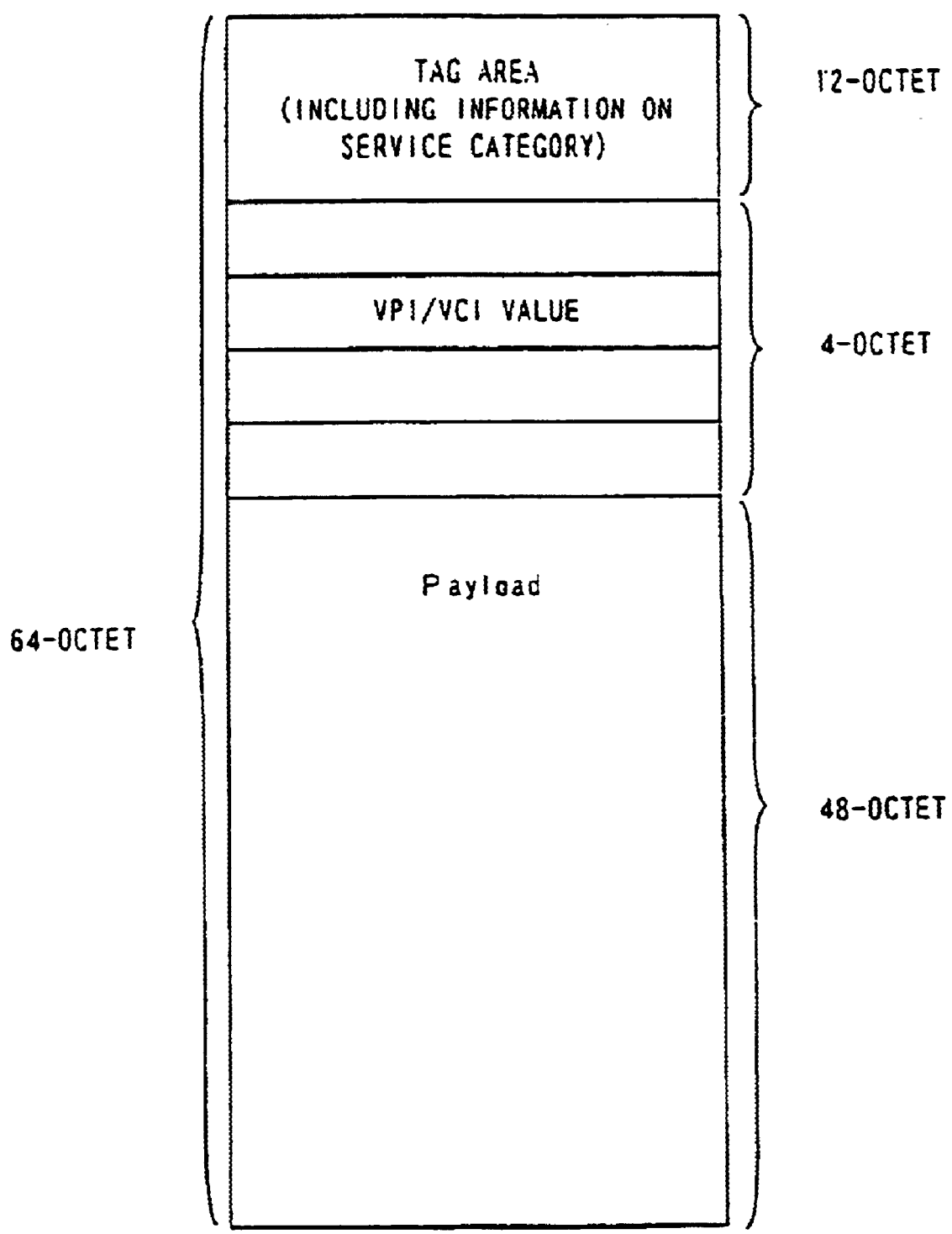
F I G. 1 6

TRAFFIC CONTROL APPARATUS AND METHOD THEREOF

BACKGROUND OF THE INVENTION

1. Field of the Invention

The present invention relates to an apparatus for controlling traffic in a packet network, and in particular, an apparatus for controlling traffic in a GFR (Guaranteed Frame Rate) service provided by an ATM (Asynchronous Transfer Mode) network.

2. Description of the Related Art

ATM has become popular as one of the core technologies used to support communications services, and research and development into it are promoted. ATM can integrate a variety of data by storing data, such as voice data, picture data, text data, etc., in a fixed-length packet called a "cell" and by transmitting the data.

FIG. 1 shows a configuration of an ATM network. An ATM network 500 usually contains a plurality of ATM switches which are connected with each other (ATM switches 510 through 530 in the drawing). Terminals are accommodated in arbitrary ATM switches.

When data are transmitted from a transmitting terminal 540 to a receiving terminal 550, the ATM network 500 first sets up a virtual path and a virtual channel for connecting these terminals. The transmitting terminal 540 stores data to be transmitted in one or more cells. Then, the transmitting terminal 540 sets a VPI/VCI (virtual path identifier/virtual channel identifier) corresponding to the virtual path and the virtual channel in the header of each cell, and transmits those cells to the ATM network 500. The ATM network 500 transfers the cells to the receiving terminal 550 based on the VPI/VCI which is set in the header of each cell. Then, the receiving terminal 550 extracts data which are stored in a received cell from the ATM network 500. In this way, in an ATM network, data are transmitted by being stored in a cell.

In ATM, each user usually can select a communication service by which data are transmitted. A service which each user is provided with, for example, is stipulated in a contract between a user and a common carrier. ATM forum defines CBR (Constant Bit Rate), rt-VBR (real time Variable Bit Rate), nrt-VBR (non-real time Variable Bit Rate), UBR (Unspecified Bit Rate) and ABR (Available Bit Rate) as service categories.

Each user declares in advance to the ATM network 500 communication parameters required in a selected service. For example, with the communication parameters, PCR (Peak Cell Rate) or SCR (Sustainable Cell Rate) is reported.

The ATM network is provided with a usage parameter control (UPC) device for monitoring and controlling traffic. As shown in FIG. 1, the UPC device 511 is provided at the entrance of the ATM network 500, and monitors, for each connection, the amount of cells flowing into the ATM network 500. Specifically, the UPC device 511 monitors a cell rate for each connection, and judges whether the cell rate exceeds a value which is declared in advance for the connection (for example, PCR). If the UPC device 511 detects a non-conforming cell, it discards the non-conforming cell or gives a low priority to the non-conforming cell. "A non-conforming cell" is a cell which arrives in a cell rate higher than a declared value or a cell which arrives before an expected time which is determined by a declared value (arrival interval and some other parameters) and an arrival timing of immediately previous cell. Giving a low priority to a cell is called "tagging". In the ATM network 500, cells with low priority are discarded when congested.

The operation algorithm of the UPC device is defined by ITU-T. Currently either a leaky bucket algorithm or a virtual scheduling algorithm is adopted. These two algorithms substantially define the same operation. With these algorithms, basically the arrival interval of cells for each connection is monitored, and whether the arrival interval deviates from a declared value corresponding to the connection is determined.

In this way, the ATM network 500 controls traffic for each connection using the UPC device 511.

Currently in ATM forum, the standardization work of GFR (Guaranteed Frame Rate), which is an improved system of a UBR, is promoted. In a GFR service, a frame specified by AAL5 (ATM adaptation layer 5) is used.

A frame conforming to the AAL5 is transmitted stored in an ATM cell via an ATM network. FIG. 2 shows how to store an AAL5 frame in a cell. The AAL5 layer is composed of a convergence sublayer (CS) and a segmentation and reassembly sublayer (SAR). User data to be transferred are generated in a layer higher in order than the AAL, and stored in a CPCS-PDU of the frame in the CS. A frame conforming to the CS is divided into every 48 bytes. Each SAR-PDU is stored in the payload of each ATM cell.

In the GFR service, the Peak cell rate PCR and the minimum cell rate MCR are declared in advance for each connection. Then, as shown in FIG. 3A, when the network is not congested, the ATM network provides a band corresponding to the declared peak cell rate PCR for a corresponding connection. In this case, if a transfer rate at a connection exceeds the declared peak cell rate PCR, a non-conforming cell is discarded. If the network is congested, as shown in FIG. 3B, the declared minimum cell rate MCR is guaranteed. However, if the transfer rate at the connection exceeds the minimum cell rate MCR, a non-conforming cell is discarded or a low priority is given to the non-conforming cell.

Traffic control in the GFR service is basically executed by the UPC device, as in other services. That is to say, the arrival interval of cells is monitored for each connection using the UPC device, and if a non-conforming cell is detected, the non-conforming cell is discarded, etc.

As described above, in the GFR service, an AAL 5 frame is used. However, if a conventional UPC device detects a non-conforming cell, it discards the non-conforming cell, etc. without taking the AAL5 frame into consideration. For this reason, there is a possibility that a condition unfavorable for providing a GFR service may occur.

For example, if an AAL5 frame is transmitted after divided and stored in a plurality of cells, the AAL5 frame cannot be reproduced at a receiving terminal when a part of the cells is discarded, even in the case where the average transfer rate of a plurality of the cells is below a declared value.

When an AAL5 frame is transmitted after divided and stored in a plurality of cells, the receiving terminal assembles a transmitted AAL5 frame by recognizing the head and end portions of the frame. Therefore, if a cell storing the end portion of a first frame is discarded when the first frame and a second frame are transmitted in succession, the receiving terminal recognizes a data sequence from the head portion of the first frame to the end portion of the second frame as one frame, and attempts to reproduce a frame from it. In this case, as a matter of fact, the first and second frames cannot be correctly reproduced. In this case, although no "non-conformity" occurs in the second frame, the receiving terminal cannot extract user data from the second frame.

As described above, in a conventional ATM system, when traffic is controlled for each connection, a data frame conforming to a layer higher in order than an ATM layer cannot be taken into consideration.

SUMMARY OF THE INVENTION

The object of the present invention is to provide an apparatus for controlling traffic in a network where packets are transmitted, taking a frame of a layer higher in order than a layer which specifies the packet into consideration.

The traffic control apparatus of the present invention is configured so as to control the traffic of a packet in a network where packets are transmitted, and comprises the following units.

A judgment unit judges whether or not the interval between packets conforms to a predetermined parameter, and generates a non-conformity notice if the interval does not conform to the parameter. When a non-conformity notice is generated by the judgement unit for a packet in which one of a plurality of data sets obtained by dividing frame data is stored, a determination unit judges whether or not to generate the non-conformity notice for a packet in which other data set obtained from the frame data is stored based on a position in the frame data of the data set stored in the packet for which the non-conformity notice is generated. A process unit discards a packet for which the non-conformity notice is generated or sets a low priority to the packet for which the non-conformity notice is generated.

When frame data are transmitted through the packet network, the frame data are divided into a plurality of data sets, and each data set is stored in a different packet. Then, a receiving terminal extracts the data set from a plurality of packets, and assembles the frame data. Therefore, if one or more of the packets in which a plurality of data sets are stored are discarded, the receiving terminal cannot assemble the frame data.

In order to cope with this problem, the traffic control apparatus of the present invention processes packets taking frame data into consideration. Thus, if a packet in which one of a plurality of data sets obtained from a certain piece of frame data is discarded, the determination unit generates an instruction to discard packets in which other data sets obtained from the frame data are stored, etc.

For example, if a packet in which the top portion (beginning portion) of the frame data is discarded, the determination unit generates non-conformity notices for all packets in which other data sets obtained from the frame data are stored. Since as described above, all packets related to the frame data are prevented from being transmitted or discarded when the network is congested, the waste of network resources can be suppressed.

If a packet in which the middle portion of frame data is discarded, the determination unit generates a non-conformity notice for packets following the discarded packet among packets in which other data sets obtained from the frame data are stored. In this case, the waste of network resources can also be suppressed for the same reason.

BRIEF DESCRIPTION OF THE DRAWINGS

FIG. 5 shows a configuration of a UPC device of one preferred embodiment of the present invention.

FIG. 7 shows a format of an ATM cell.

FIG. 8 shows an example of UPC table.

FIG. 13 is a flowchart showing the operation of a cell process unit.

FIG. 15 shows a configuration of a cell buffer device for which an ATM switch is provided.

FIG. 16 shows a configuration of a cell to which tag information is attached.

DESCRIPTION OF THE PREFERRED EMBODIMENT

Figure 1:
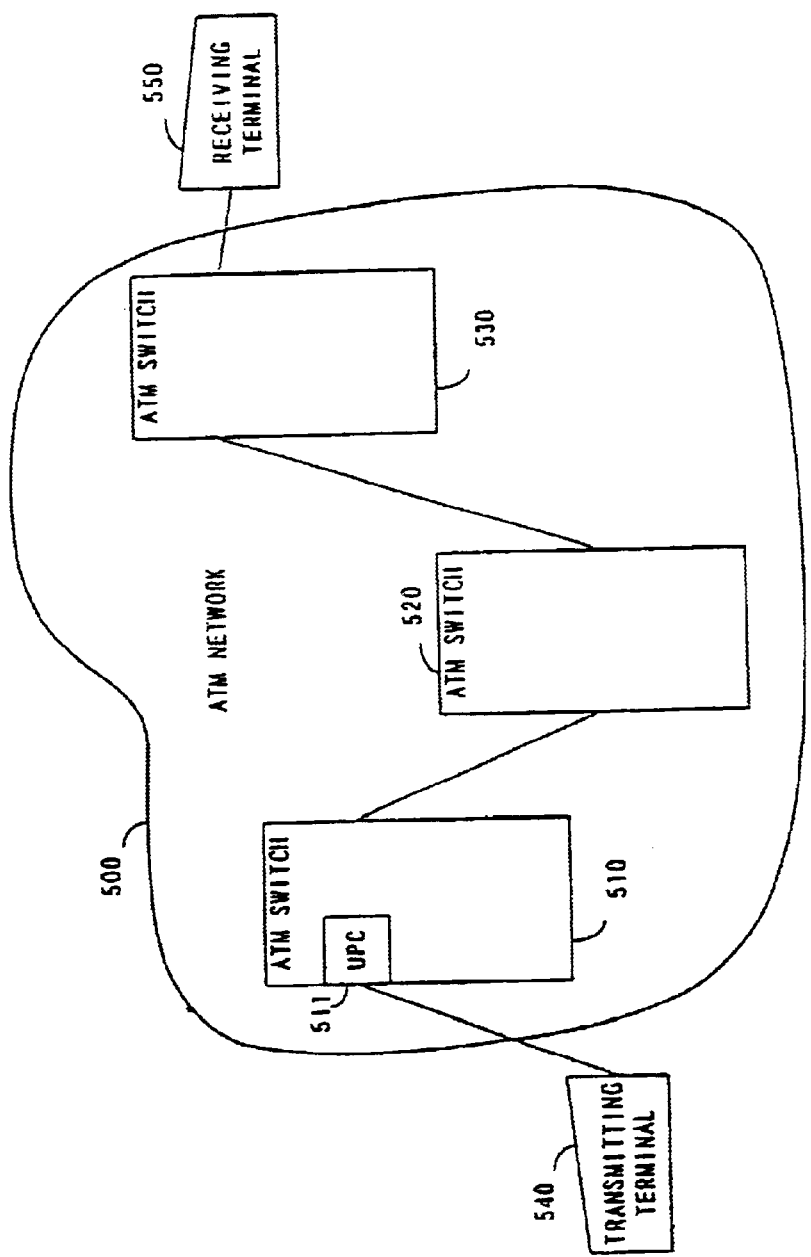
FIG. 1 shows a configuration of an ATM network.
Figure 2:
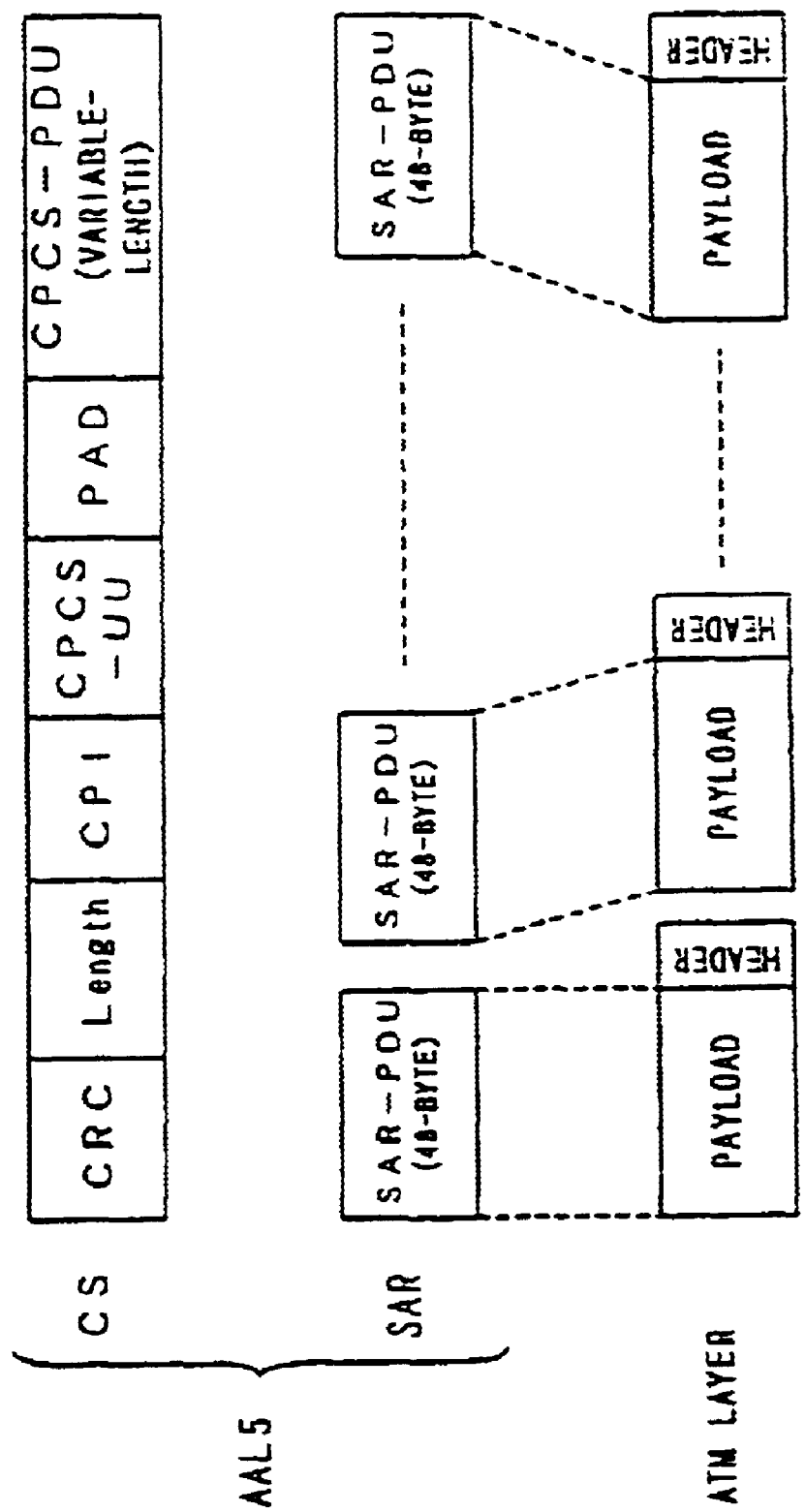
FIG. 2 shows how to store a frame which conforms to AAL5 in a cell.
Figure 3A:
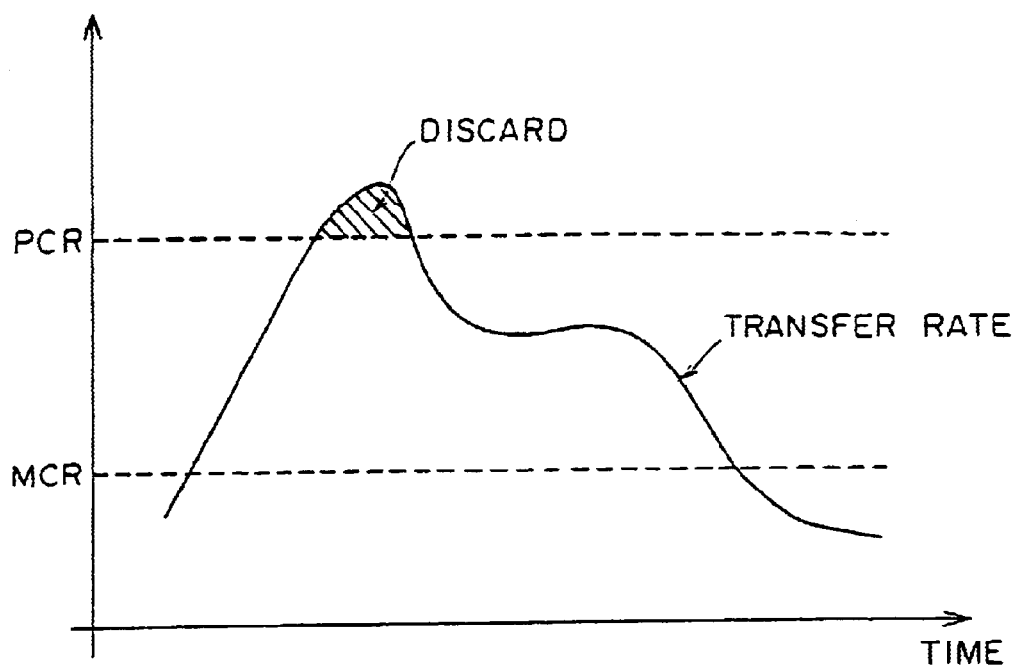
FIGS. 3A and 3B explain traffic control in a GFR service.
Figure 3B:
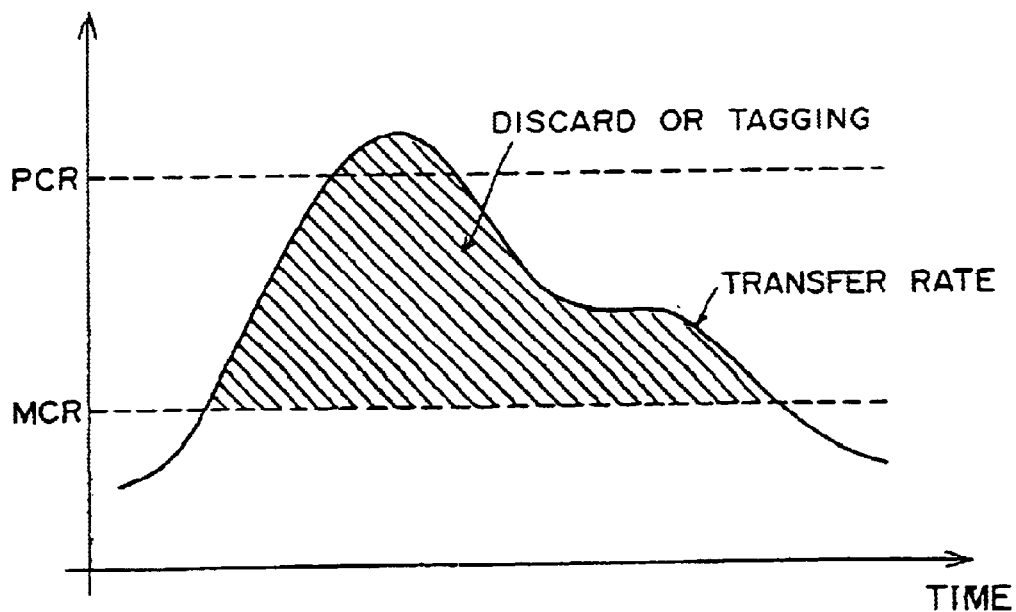

The preferred embodiment of the present invention is described below with reference to the drawings. Although the present invention can be widely applied to apparatuses for controlling traffic in a network where fixed-length packets are transmitted. An ATM network is used as an example and described below. The configuration of the ATM network is, for example, shown in FIG. 1.

Figure 4:
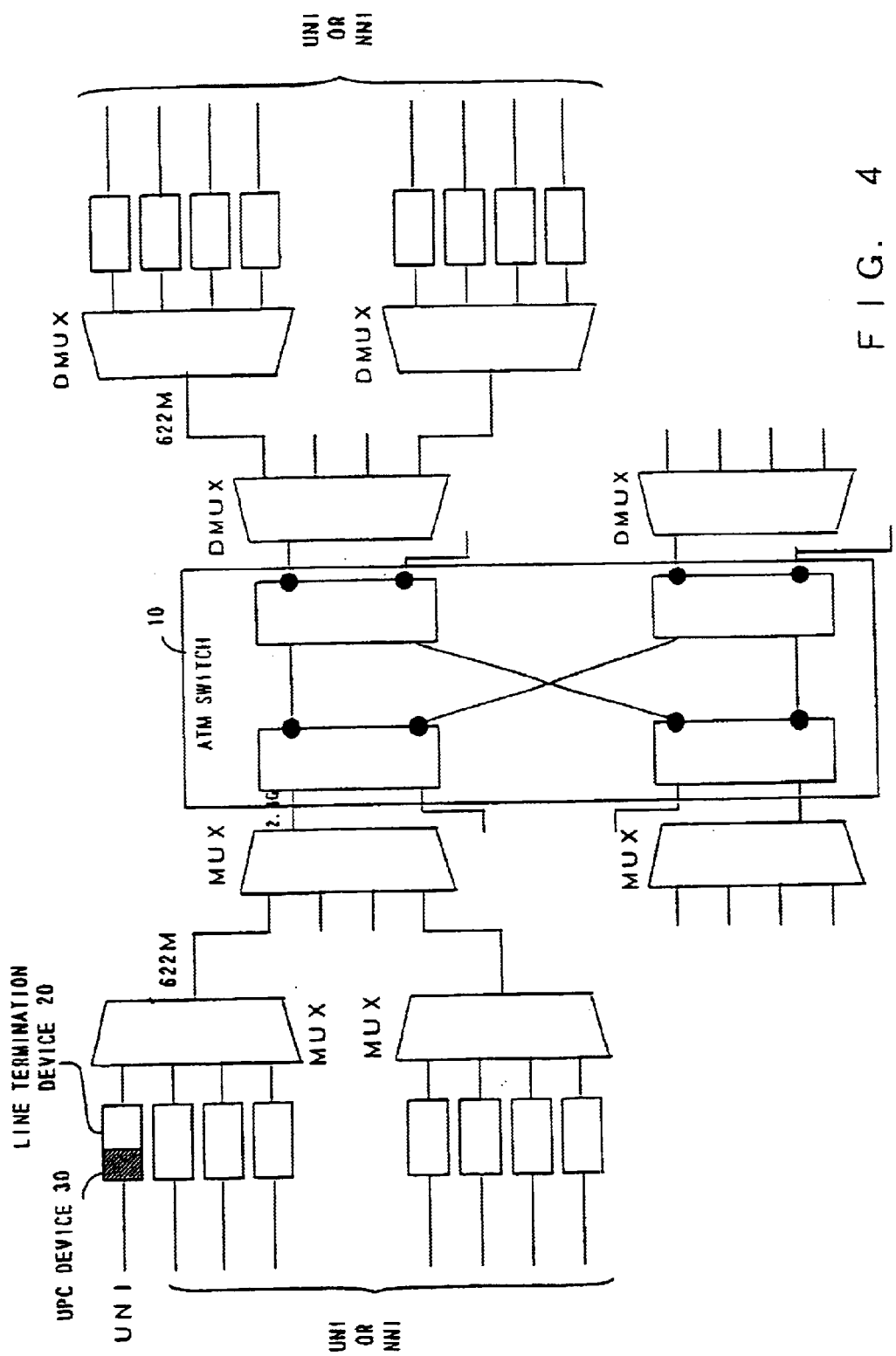
FIG. 4 shows a configuration of ATM switches installed in an ATM network.

FIG. 4 shows a configuration of ATM switches installed in an ATM network. An ATM switch 10, for example, corresponds to one arbitrary switch of ATM switches 510 through 530 shown in FIG. 1, and accommodates many user—user interface (UNI) lines and network-node interface (NNI) lines. A UNI line is a line which connects a terminal (user) and an ATM network. An NNI line is a line which connects ATM switches with each other. The ATM switch 10 has a plurality of switch modules, and outputs an inputted cell to an output line which is designated by routing information which is set in the cell.

The UNI lines and NNI lines are terminated by a line termination device 20. A cell inputted from each line is multiplexed by a multiplexer MUX and is inputted to an ATM switch 10. A cell outputted from the ATM switch 10 is outputted to a designated UNI line or NNI line by a demultiplexer DMUX. In FIG. 4, black circles indicate positions at which cells are likely to be discarded due to congestion.

Each line termination device 20 is provided with a usage parameter control (UPC) device 30. The UPC device 30 is basically installed for a UNI line. The present invention mainly relates to this UPC device.

FIG. 5 shows a configuration of a UPC device of one preferred embodiment of the present invention. The UPC device is provided with a function to determine the process for a non-conforming cell while taking into consideration a frame which conforms to AAL5 in addition to conventional UPC functions.

A UPC process unit 31 is basically the same as a conventional UPC device, and judges according to a virtual scheduling algorithm or leaky bucket algorithm for each connection whether an arrived cell is a conforming cell or non-conforming cell. Here, the UPC process unit 31 is assumed to operate according to the virtual scheduling algorithm. A cell class judgment unit 32, a frame process unit 34, a variation value calculation unit 34 and a cell process unit 35 are provided in order to execute the process for an AAL5 frame. The functions of the cell class judgment unit 32 and cell process unit 35 partially overlap functions which a conventional UPC device is provided with.

Figure 6:
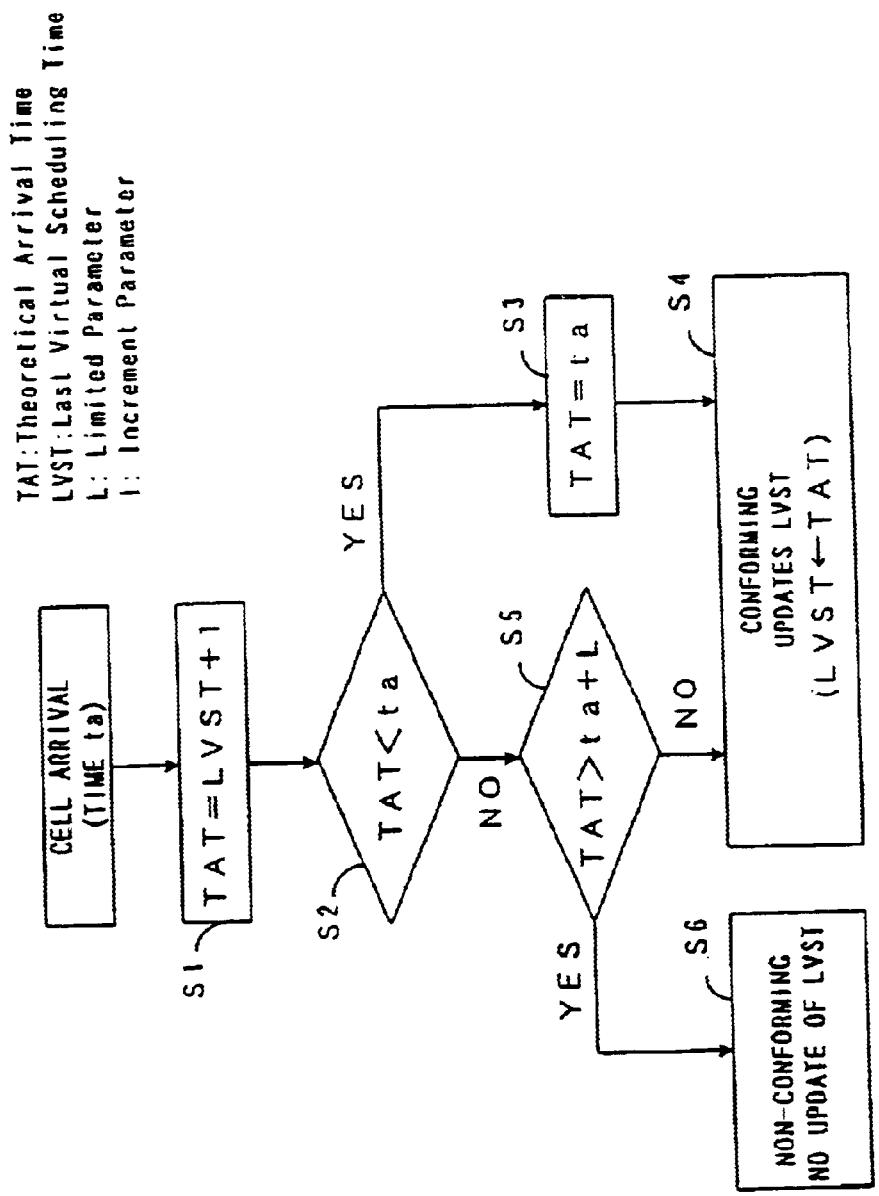
FIG. 6 is a flowchart showing the basic process of a virtual scheduling algorithm.

FIG. 6 is a flowchart showing the basic process of a virtual scheduling algorithm. This process is executed for each connection. The process is executed for each arrived cell for each connection. The process after a cell arrives at time ta is described below.

In step S1, a theoretical arrival time TAT for an arrived cell is calculated. The theoretical arrival time TAT can be obtained by adding an increment parameter I to a last virtual scheduling time LVST for the immediately previous conforming cell. An increment parameter I, for example, is the reciprocal of a transfer rate (for example, the peak cell rate PCR) which is declared by a user for each connection.

In step S2, it is checked whether the actual arrived time ta of the arrived cell is earlier or later than the theoretical arrival time TAT calculated in step S1. If the actual arrived time ta is later than the theoretical arrival time TAT, the arrived cell is recognized as a conforming cell since this means that the interval between the arrived time of a immediately previous cell and the arrived time of a currently arrived cell exceeds a declared value. In this case, in step S3, the actual arrived time ta is assigned to the theoretical arrival time TAT.

In step S4, a signal which indicates that the arrived cell is a "conforming cell" is outputted. The last virtual scheduling time LVST is updated for the purpose of processing a next arrived cell. Here, the theoretical arrival time TAT is assigned to the last virtual scheduling time LVST.

If the actual arrived time ta precedes the theoretical arrival time TAT ("No" in step S2), the flow proceeds to step S5 since this means that the interval between the arrived time of a immediately previous cell and the arrived time of a currently arrived cell is shorter than the declared value.

In step S5, it is checked whether the arrived cell is a conforming cell, while a variation tolerance is taken into consideration. For the variation tolerance value, a value which is declared for each connection is usually used. It is checked whether a time which is obtained by adding a variation tolerance L to the actual arrived time ta of the arrived cell is earlier or later than the theoretical arrival time TAT. If the time which is obtained by adding a variation tolerance L to the actual arrived time ta of the arrived cell is later than the theoretical arrival time TAT, the flow proceeds to step S4. If the time which is obtained by adding a variation tolerance L to the actual arrived time ta of the arrived cell is earlier than the theoretical arrival time TAT, the flow proceeds to step S6.

In step S6, a signal indicating that the arrived cell is a "non-conforming (violating)" cell is outputted. In step S6, the last virtual scheduling time LVST is not updated. By these processes, it is judged whether the arrived cell is a conforming cell or non-conforming cell.

Referring to FIG. 5, the operation of the cell class judgment unit 32 is described. The cell class judgment unit 32 judges a class to which an arrived cell belongs based on information which is stored in the header of the arrived cell.

FIG. 7 shows a format of an ATM cell. Here, a format in a UNI is shown. A cell is basically composed of a header of five bytes and a payload of 48 bytes. In the header are stored GFC (Generic Flow Control), VPI (Virtual Path Identifier), VCI (Virtual Channel Identifier), PTI (Payload Type Identifier), CLP (Cell Loss Priority), and HEC (Header Error Control).

PTI is basically set by a transmitting terminal. If user data are stored in the payload of the cell, PTI="0xx", and if control data are stored, PTI="1xx". "x" is a value of 0 or 1. A cell in which control data are stored is, for example, an OAM (Operation and Maintenance) cell or RM (resource management) cell.

If a cell transmits an AAL5 frame, the PTI of a cell in which data in the end portion of the frame are stored is set to "0x1" (PTI="0x1"), and the PTIs of other cells are set to "0x0" (PTI="0x0").

When a cell arrives, the cell class judgment unit 32 transmits the cell to the cell process unit 35 as it is, and simultaneously extracts PTI, CLP and VPI/VCI (combination of VPI and VCI) from the header of the cell. Then, for the arrived cell, the cell class judgment unit 32 performs a search for a UPC table 36 using the extracted VPI/VCI as a key, and checks whether it is necessary to execute a UPC process for the arrived cell and to execute a UPC process in which an AAL5 frame is taken into consideration.

FIG. 8 shows an example of UPC table 36. The UPC table 36 stores a variety of parameters related to a UPC process for each connection using the VPI/VCI as a key. Each parameter is described below.

"PCR", "SCR" and "MCR" are transfer rates of a cell which are to be declared in advance. "CDVT (Cell Delay Variation Time)" and "MBS (maximum burst size or maximum burst second)" are parameters used for specifying a tolerance for the variation of the arrival interval of cells. These two parameters are also declared in advance.

"UPC_ID" indicates a service category which is provided to the relevant connection. For the service categories, for example, CBR, rt-VBR, nrt-VBR, UBR, ABR and GFR are provided. This parameter is, for example, set when a connection is established.

"UPC_EN" indicates whether to execute a UPC process for the relevant connection. This parameter is, for example, set when a connection is established.

"TOP" indicates whether data at the top portion of an AAL5 frame are stored in the payload of an arrived cell. This parameter is, for example, written by the frame process unit 33.

"EN_frame" indicates whether to execute a UPC process, for the relevant connection, in which an AAL5 frame is taken into consideration. This parameter is, for example, set when a connection is established.

"PTI" indicates the type of information which is stored in the payload of the arrived cell. This parameter is extracted from the header of the arrived cell.

"EOF" indicates whether data at the end portion of the AAL5 frame are stored in the payload of the arrived cell. This parameter is, for example, written by the frame process unit 33.

"F_FLAG" indicates whether to execute a UPC process in which an AAL5 frame is taken into consideration for the cell process unit 35. This parameter is, for example, written by the frame process unit 33.

"P_DIS" indicates whether to discard the arrived cell. "P_TAG" indicates whether to perform tagging for the arrived cell. These parameters are, for example, written by the frame process unit 33.

"W_DIS" indicates whether to discard all cells in which an AAL5 frame is stored when a part of the AAL5 frame is stored in the payload of the arrived cell. "W_TAG" indicates whether to perform tagging for all cells in which an AAL5 frame is stored when a part of the AAL5 frame is stored in the payload of the arrived cell. These parameters are, for example, written by the frame process unit 33.

"CLP_in" indicates the cell discard priority of the arrived cell. This parameter is extracted from the header of the arrived cell or determined by the frame process unit 33.

"DIS_FLAG" indicates whether to compulsorily discard the arrived cell. This parameter is determined by the frame process unit 33.

"var_L" is a parameter related to variation in the UPC process. This parameter is calculated by the variation value calculation unit 34.

"UPC_DIS" indicates whether to discard the arrived cell. "UPC_TAG" indicates whether to perform tagging for the arrived cell. These parameters are instructions to the cell process unit 35, and are determined by the UPC process unit 31.

Each of these parameters is described in further detail with reference to a flowchart, etc., described later.

If the functions of the cell class judgment unit 32, frame process unit 33, variation value calculation unit 34 and cell process unit 35 are realized by a processor (CPU) executing a predetermined program, a UPC table 36 is generated in a memory, such as RAM, etc. If the functions of the cell class judgment unit 32, frame process unit 33, variation value calculation unit 34 and cell process unit 35 are realized using hardware circuitry, the UPC table 36 is also generated using a hardware circuit. In this case, each parameter is, for example, stored in a register or flip-flop circuit. The UPC table 36 can also be generated by the combined use of a hardware circuit and memory. Alternatively, a part of the parameters are not stored in the UPC table 36, and can be directly sent and received between the UPC process unit 31, the cell class judgment unit 32, the frame process unit 33, the variation value calculation unit 34 and the cell process unit 35.

If in FIG. 5, an AAL5 frame is stored in the payload of an arrived cell, as the preprocessing of a UPC process, the frame process unit 33 judges whether the stored data are data in the top portion (beginning portion), the end portion or other portions (hereinafter sometimes referred to as "middle portion") of the AAL5 frame, and updates a variety of the parameters based on the judgment result.

Figure 9:
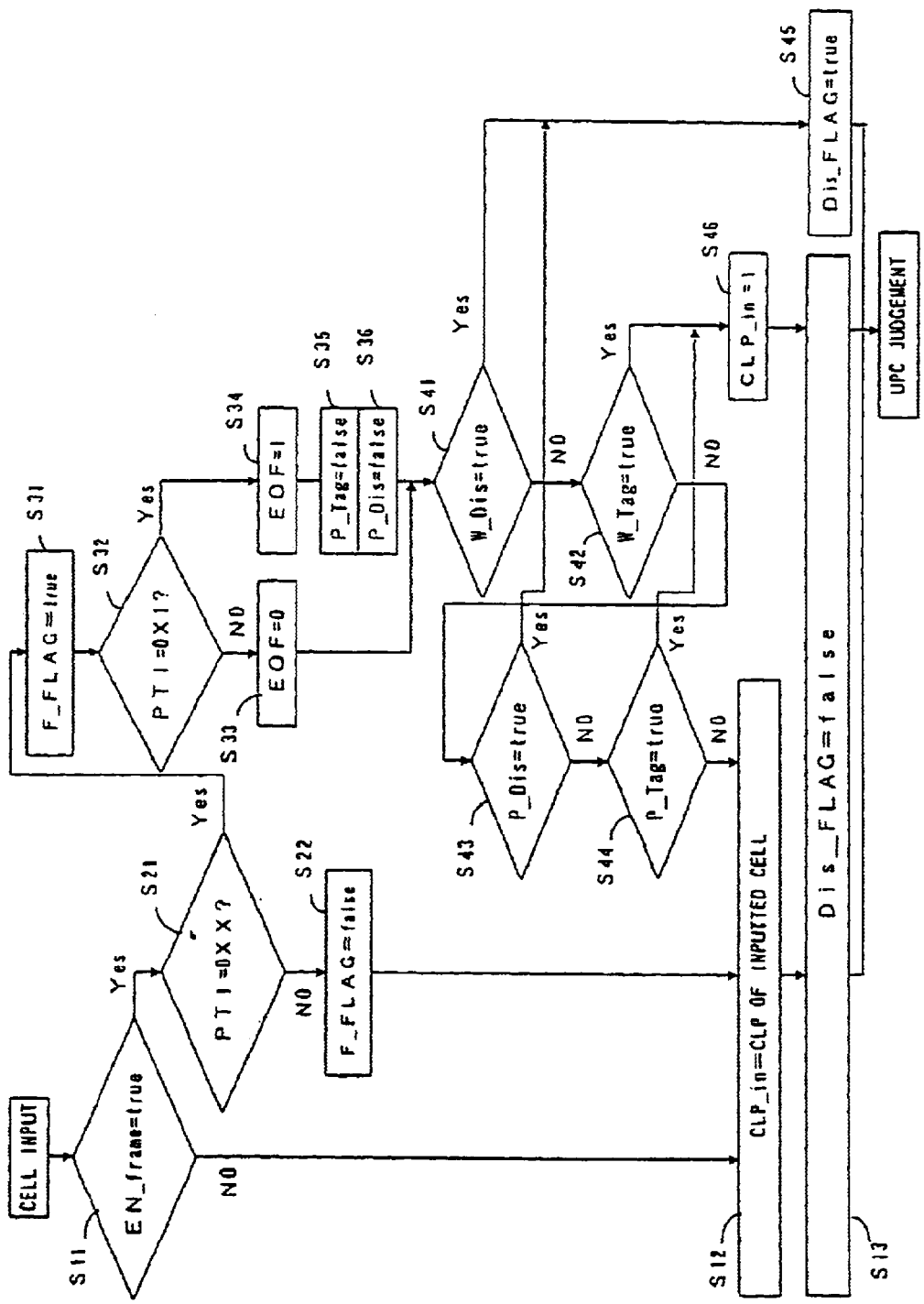
FIG. 9 is a flowchart showing the operations of a cell class judgment unit and a frame process unit used as the preprocessing of a UPC process.

FIG. 9 is a flowchart showing the operations of a cell class judgment unit 32 and a frame process unit 33 as the preprocessing of an UPC process. These processes are executed every time a cell arrives at the UPC device 30.

When a cell arrives, the cell class judgment unit 32 refers to the "UPC_EN" of a UPC table 36 using VPI/VCI which is set in the header of the arrived cell as a key, prior to the execution of step S11, and judges whether to execute a UPC process. The cell class judgment unit 32 also refers to the "UPC_ID" of the UPC table 36, and detects its service category. Then, it reports these detection results to the UPC process unit 31.

In step S11, the "EN_frame" of the UPC table 36 is referred to using VPI/VCI which is set in the header of the arrived cell as a key, and it is checked whether to execute a UPC process in which an AAL5 frame is taken into consideration. If the UPC process in which an AAL5 frame is taken into consideration is not executed, in step S12, CLP which is set in the header of the arrived cell is written in the "CLP_in" of the UPC table 36. Then, in step S13, "false" is written in the "DIS_FLAG" of the UPC table 36.

If the UPC process in which an AAL5 frame is taken into consideration is executed ("Yes" in step S11), in step S21, it is checked whether data which are stored in the payload of the arrived cell are user data or control data, based on PTI which is set in the header of the cell. If PTI="1xx", the data are judged to be control data, and the flow proceeds to step S22. If PTI="0xx", it is judged that the data are user data, and the flow proceeds to step S31.

If the arrived cell stores control data, in step S22, "false" is written in the "F_FLAG" of the UPC table 36 in such a way that a UPC process in which an AAL5 frame is taken into consideration may not be executed even if "EN_frame" specifies execution of the UPC process in which an AAL5 frame is taken into consideration. Then, steps S12 and S13 are executed.

If the arrived cell stores user data ("Yes" in step S21), in step S31, "true" is written in the "F_FLAG" of the UPC table 36 in such a way that a UPC process in which an AAL5 frame is taken into consideration may be executed. In step S32, it is checked whether the end portion of the AAL5 frame is stored in the payload of the arrived cell, based on PTI which is set in the header of the cell. If PTI="0x0", it is judged that the end portion of the AAL5 frame is not stored in the arrived cell, and the flow proceeds to step S33. If PTI="0x1", it is judged that the end portion of the AAL5 frame is stored in the arrived cell, and the flow proceeds to step S34.

In step S33, "0" is written in the "EOF" of the UPC table 36. In step S34, "1" is written in the "EOF" of the UPC table 36. In steps S35 and S36, "false" is written in "P_TAG" and "P_DIS" of the UPC table 36, respectively.

As described above, if the end portion of the AAL5 frame is stored in the arrived cell, "P_TAG" and "P_DIS" are updated in such a way that the cell may not be discarded. If the end portion of the AAL5 frame is not stored in the arrived cell, "P_TAG" and "P_DIS" are not updated. In this case, "P_TAG" and "P_DIS" are maintained in the same state as the case where the previous arrived cell is processed.

In steps S41 through S46, "W_DIS", "W_TAG", "P_DIS" and "P_TAG", which are set in the UPC table 36, are referred to, and "DID_FLAG" and "CLP_in" are updated. The four parameters referenced at this time are values which are updated when the previous arrived cell is processed, which is described later.

In step S41, it is checked whether it is necessary to discard the arrived cell, based on the "W_DIS" of the UPC table 36. If it is judged that it is necessary to discard the arrived cell, in step S45, "true" is written in the "DIS_FLAG" of the UPC table 36. In step S42, it is checked whether it is necessary to perform tagging for the arrived cell, based on the "W_TAG" of the UPC table 36. If it is judged that it is necessary to perform tagging for the arrived cell, in step S46, "1" is written in the "CLP_in" of the UPC table 36.

Processes in steps S43 and S44 are basically the same as those in steps S41 and S42. If it is judged that it is necessary to discard the arrived cell, in step S45, "true" is written in the "DIS_FLAG" of the UPC table 36, and if it is judged that it is necessary to perform tagging for the arrived cell, in step S46, "1" is written in the "CLP_in" of the UPC table 36.

If it is judged that it is not necessary to discard the arrived cell and it is also not necessary to perform tagging for the arrived cell ("No" in steps S41 through S44), steps S12 and S13 are executed.

As described above, the frame process unit 33 determines "UPC_ID", "DIS_FLAG" and "CLP_in" for an arrived cell as the preprocessing of the UPC process. These parameters are used in the UPC process by the UPC process unit 31 or at later stages. The UPC process unit 31, for example, directly receives the parameters from the frame process unit 33. Alternatively, the frame process unit 33 can be designated to write the parameters in the UPC table 36 and the UPC process unit 31 can be designated to read them.

The UPC process unit 31 basically judges whether each arrived cell is a conforming cell or a non-conforming cell, by executing the process in the flowchart shown in FIG. 6. However, when judging, the UPC process unit 31 refers to the values of parameters provided by the frame process unit 33.

When receiving a cell which is transmitted in a GFR service, the UPC process unit 31 judges whether the cell is a conforming cell or a non-conforming cell, based on the following three conditions.

A: I=1/PCR, L=CDVT
B: I=1/SCR, L=BT/2+CDVT
C: I=1/SCR, L=BT+CDVT

Provided, however, that BT=(MBS−1)·(Is−Ip)
Is=1/SCR
Ip=1/PCR

Condition A targets all cells. Condition B targets cells in which the top portion of an AAL5 frame is stored. Condition C targets cells other than cells in which the top portion is stored, among cells in which the AAL5 frame is stored.

Figure 10:
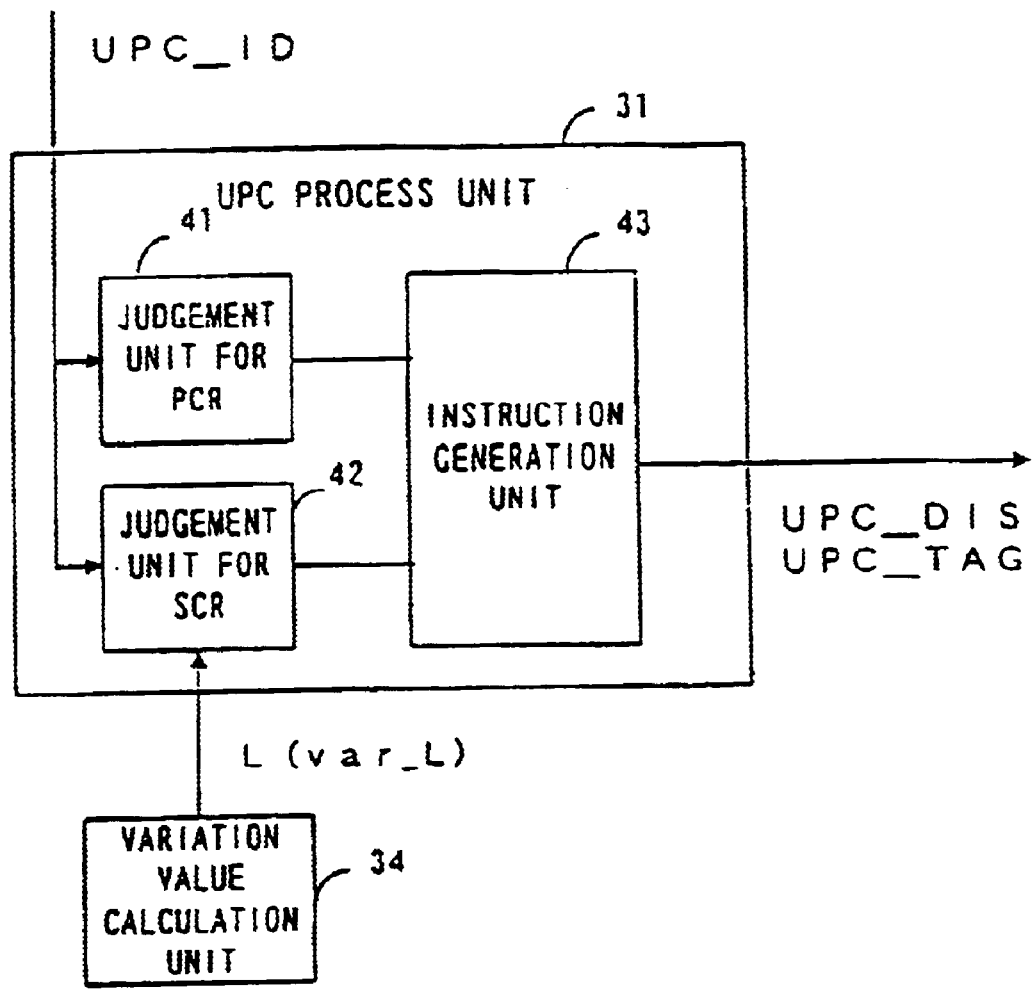
FIG. 10 shows a configuration of a UPC process unit.

FIG. 10 shows a configuration of a UPC process unit 31. A judgment unit for PCR 41 judges whether an arrived cell is a conforming cell or a non-conforming cell, by executing the process in the flowchart shown in FIG. 6 using values given by condition A for the "I" and "L" of a virtual scheduling algorithm. A judgment unit for SCR 42 judges whether an arrived cell is a conforming cell or a non-conforming cell, by executing the process in the flowchart shown in FIG. 6 using values given by conditions B or C for the "I" and "L" of the virtual scheduling algorithm. Conditions B and C have different variation tolerances Ls.

The variation tolerance L is provided by the variation value calculation unit 34. The variation value calculation unit 34 calculates a variation tolerance L based on the parameters "F_FLAG" and "TOF" described above. Specifically, if "F_FLAG" is "true" and "TOF" is also "true", the variation value calculation unit 34 outputs a value which is specified by condition B, as a variation value L. If "F_FLAG" is "true" and "TOF" is "false", it outputs a value which is specified by condition C, as a variation value L.

The variation value calculation unit 34 can directly receive "F_FLAG" and "TOF" from the frame process unit 33 or read them from the UPC table 36. Parameters "PCR", "SCR", "CDVT" and "MBS" which are used for conditions B or C are stored in advance in the UPC table 36. If "F_FLAG" is "false", the variation value calculation unit 34 outputs nothing.

The instruction generation unit 43 generates an instruction (non-conformity notice) to be sent to the cell process unit 35. This instruction is provided to the cell process unit 35 as "UPC_DIS" and "UPC_TAG". If "UPC_DIS"="true", the cell process unit 35 discards an arrived cell, and if "UPC_DIS" is "false", it passes the arrived cell without modification. In the same way, if "UPC_TAG"="true", the cell process unit 35 sets "1" to the CLP of the arrived cell and transmits it to a network. If "UPC_TAG"="false", it passes the arrived cell without modification. The operation of the cell process unit 35 is described later.

The instruction generation unit 43 determines an instruction (that is, "UPC_DIS" and "UPC_TAG") to be sent to the cell process unit 35, based on the judgment result of both the judgment unit for PCR 41 and the judgment unit for SCR 42. For generating instructions, a variety of methods can be considered. Examples of how to generate instructions are described below.

(1) Discards cells which are judged to be "non-conforming cells" by the judgment unit for PCR 41, and performs tagging for cells which are judged to be "non-conforming cells" by only the judgment unit for SCR 42.

(2) Discards cells which are judged to be "non-conforming cells" by at least one of the judgment unit for PCR 41 and judgment unit for SCR 42.

(3) Performs tagging for cells which are judged to be "non-conforming cells" by at least one of the judgment unit for PCR 41 and judgment unit for SCR 42.

Figure 11:
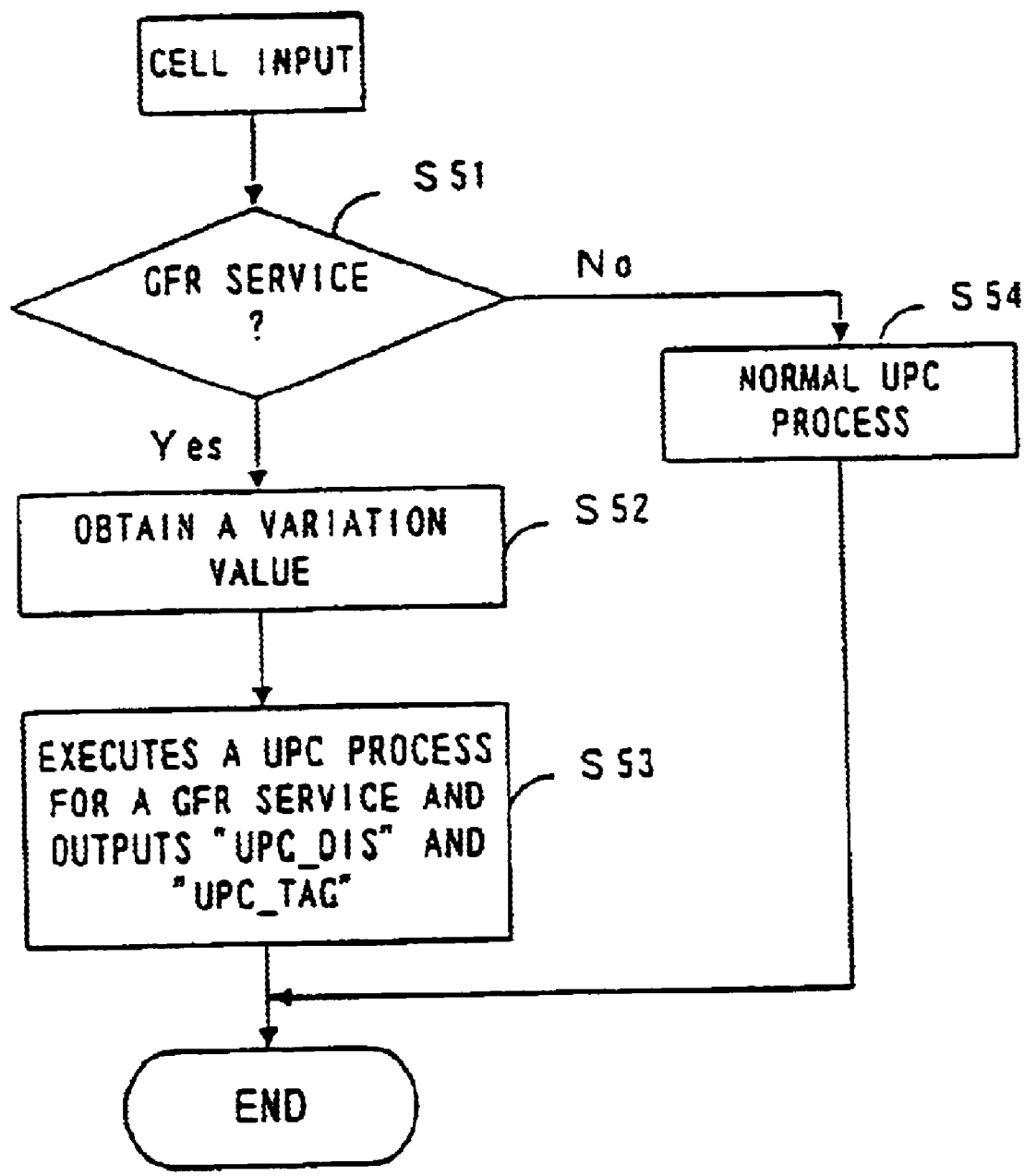
FIG. 11 is a flowchart showing the operation of a UPC process unit.

FIG. 11 is a flowchart showing the operation of a UPC process unit 31. This process is executed each time a cell arrives.

In step S51, the UPC process unit 31 judges whether a service which is provided by the relevant connection is a GFR service, based on "UPC_ID". If it is not a GFR service, in step S54, it outputs "UPC_DIS" and "UPC_TAG" by executing a normal UPC process.

If it is a GFR service, in step S52, the UPC process unit 31 obtains a variation tolerance L from the variation value calculation unit 34. Then, in step S53, it judges whether an arrived cell is a conforming cell or non-conforming cell, using the judgment unit for PCR 41 and the judgment unit for SCR 42, determines "UPC_DIS" and "UPC_TAG" based on the judgment results, and outputs them.

As described above, the operation of the UPC process unit 31 is basically the same as a conventional UPC process except that parameters which are used in a virtual scheduling algorithm vary for a connection in which a GFR service is provided.

Next, postprocessing by the frame process unit 33 is described. When a UPC process is executed for a cell in which a part of an AAL5 frame is stored, as the postprocessing of a UPC process by the UPC process unit 31, the frame process unit 33 updates parameters which are used to process subsequent cells.

Figure 12:
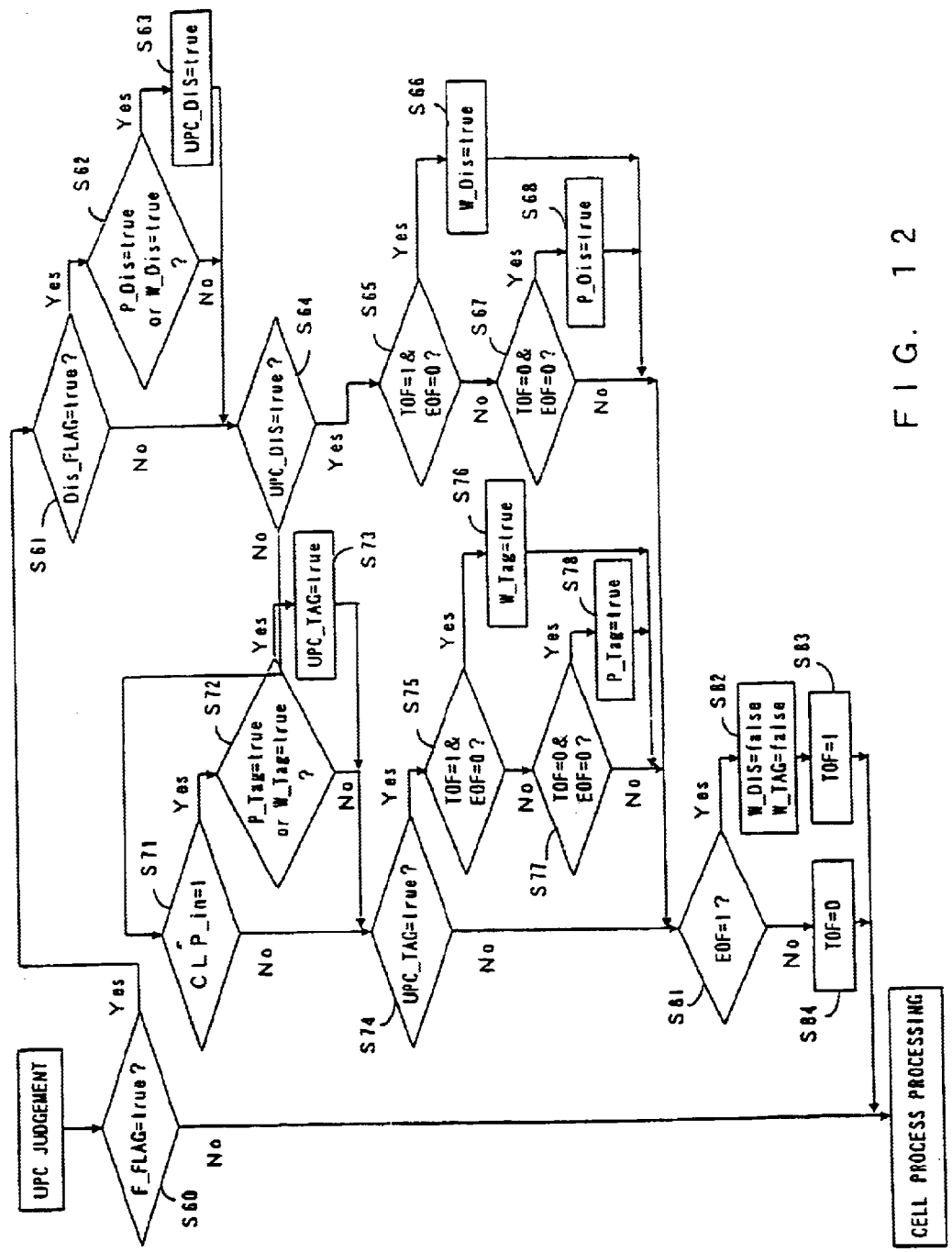
FIG. 12 is a flowchart showing the operation of a frame process unit used as the postprocessing of a UPC process.

FIG. 12 is a flowchart showing the operation of a frame process unit 33 as the postprocessing of a UPC process. This process is executed each time a cell arrives. A cell in which the top portion of an AAL5 frame is stored, a cell in which the middle portion of the AAL5 frame is stored, and a cell in which the end portion of the AAL5 frame is stored may be called "TOF cell", "MOF cell", and "EOF cell", respectively, in order to simplify the description.

In step S60, the frame process unit 33 refers to the "F_FLAG" of the UPC table 36, and checks whether a UPC process in which an AAL5 frame is taken into consideration has been executed for an arrived cell. This "F_FLAG" is a value which is set in step S22 or S31 in FIG. 9. Therefore, if a part of the AAL5 frame is stored in the payload of the arrived cell, "F_FLAG"="true", and the flow proceeds to step S61. If the AAL5 frame is not stored in the payload of the arrived cell or if the arrived cell is a control cell, "F_FLAG"="false", and the process is terminated without the execution of the processes in steps S61 and after.

In step S61, the frame process unit 33 refers to "DIS_FLAG", and judges whether an instruction to compulsorily discard the arrived cell in the above-described preprocessing has been generated. If the compulsory discard instruction has been generated, in step S62, it checks "P_DIS" and "W_DIS". If at least one of these parameters is "true", in step S63, it writes "true" in "UPC_DIS".

In step S64, the frame process unit 33 refers to "UPC_DIS", and checks whether an instruction to discard the arrived cell has been generated. Thus, if an instruction to discard the arrived cell has been generated in the UPC process unit 33 or if in steps 61 through 63, "UPC_DIS" is compulsorily updated, the flow proceeds to step S65, and otherwise the flow proceeds to step S71.

In step S65, the frame process unit 33 judges whether the arrived cell is a TOF cell, based on the "TOF" and "EOF" of the UPC table 36. If the arrived cell is a TOF cell, in step S66, it writes "true" in "W_DIS". In step S67, it checks whether the arrived cell is an MOF cell. If the arrived cell is an MOF cell, in step S68, it writes "true" in "P_DIS". If the arrived cell is an EOF cell, steps S66 and S68 are not executed.

As described above, if "DIS_FLAG" which is obtained by the process of steps S61 through S68 in the flowchart shown in FIG. 9 is "true" and "P_DIS" or "W_DIS" is "true", the frame process unit 33 outputs an instruction to compulsorily discard the arrived cell regardless of the judgment result of both the judgment unit for PCR 41 and the judgment unit for SCR 42. If an instruction to discard a TOF cell is outputted, the frame process unit 33 writes "true" in "W_DIS". If an instruction to discard an MOF cell is outputted, it writes "true" in "P_DIS". These parameters are referred to in step S41 or S43 shown in FIG. 9, when a next arrived cell is processed.

Processes in steps S71 through S78 are basically the same as those in steps 61 through S68. Provided, however, that steps S61 through S68 are processes in the case where an arrived cell is discarded, while steps S71 through S78 are processes in the case where tagging is performed for the arrived cell. Therefore, in steps S61 through S68 and steps S71 through S78, both parameters to be referenced to and parameters to be updated differ from each other.

In steps S71 through S78, if "CLP_in", which is obtained by the process in the flowchart shown in FIG. 9, is "1" and "P_TAG" or "W_TAG" is "true", the frame process unit 33 outputs an instruction to compulsorily set the CLP of the arrived cell to "1" regardless of the judgment results of both the judgment unit for PCR 41 and the judgment unit for SCR 42. If an instruction to perform tagging for a TOF cell is outputted, the frame process unit 33 writes "true" in "W_TAG". If an instruction to perform tagging for an MOF cell is outputted, it writes "true" in "P_TAG". These parameters are referenced to in step S42 or S44 shown in FIG. 9, when a next arrived cell is processed.

In step S81, the frame process unit 33 refers to "EOF" which is updated in step S33 or 34 of the flowchart shown in FIG. 9, and checks whether the arrived cell is an EOF cell. If the arrived cell is an EOF cell, it judges that the top portion of a next AAL5 frame is stored in the payload of a next arrived cell, in step S82, it resets both "W_DIS" and "W_TAG", and in step S83, it writes "1" in "TOF". If the arrived cell is not an EOF cell, in step S84, it writes "0" in "TOF".

FIG. 13 is a flowchart showing the operation of a cell process unit 35. This process is executed each time a cell arrives.

In step S91, the cell process unit 35 judges whether to discard an arrived cell, based on "UPC_DIS" which is provided by the frame process unit 33. If "UPS_DIS"= "true", in step S92, it discards the arrived cell. In step S93, it judges whether to perform tagging for the arrived cell, based on "UPC_TAG" which is provided by the frame process unit 33. If "UPC_TAG"="true", in step S94, it sets "1" to the CLP of the arrived cell and transmits it to a network. If "UPC_DIS"="false" and "UPC_TAG"= "false", in steps S95, it transmits the arrived cell to the network without modification.

The operation of the cell process unit 35 shown in FIG. 13 is realized in the conventional UPC device.

Next, the detailed operation of the UPC device of this preferred embodiment is described.

Figure 14:
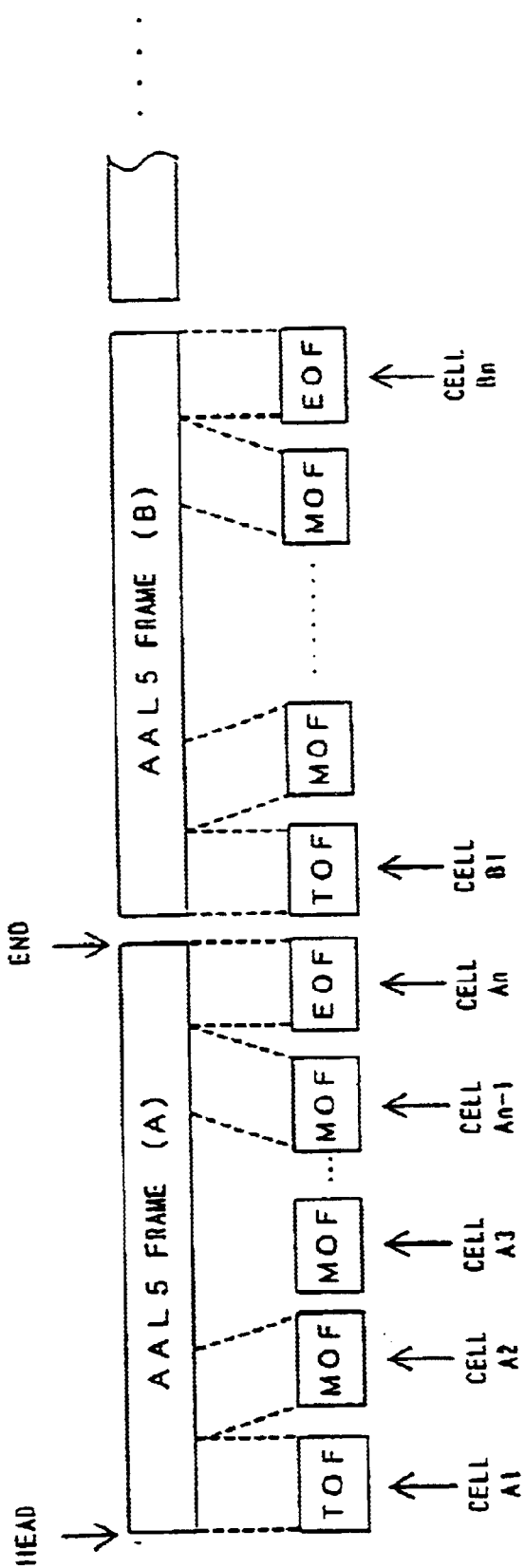
FIG. 14 shows how to store in a cell an AAL5 frame to be used in a GFR service.

FIG. 14 shows how to store in a cell an AAL5 frame to be used in a GFR service, which is mentioned in the operation descriptions described later. Here, it is assumed that user data to be transmitted are stored in a plurality of AAL5 frames in order. Each AAL5 frame is divided into a plurality of data sets, and are stored in a TOF cell, MOF cells and an EOF cell. There are usually a plurality of MOF cells.

The operations of the UPC device of this preferred embodiment in the case when a TOF cell, MOF cell and EOF cell arrive is explained, respectively. Although as described above, the UPC device of this preferred embodiment can execute both a process of discarding a non-conforming cell and performing tagging for a non-conforming cell, in order to simplify the description, only the operation to discard the non-conforming cell is described below. Thus, a description is given assuming that there is no steps S12, S35, S44, S46 and S71 through S78 in FIGS. 9 and 12.

When a TOF Cell is a Conforming Cell

When a TOF cell arrives, the judgment result in step S32 becomes "No". Immediately before this TOF cell arrives, the EOF cell of the previous AAL5 frame must have arrived. For example, in FIG. 14, a cell An arrives immediately before a cell B1 arrives. Thus, when the EOF cell has arrived immediately before the TOF cell arrives, step S35 must have been executed. Therefore, when the relevant TOF cell arrives, "P_DIS" is "false".

Then, in step S41, "W_DIS" is checked. When the EOF cell of a previous AAL5 frame arrives, this parameter must have been reset in step S82 shown in FIG. 12. Therefore, the judgment result in step S41 becomes "No". Since as described above, "P_DIS" is "false" when the relevant TOF arrives, the judgment result in step S43 becomes "No". Therefore, in this case, step S45 is not executed and step S13 is executed.

As described above, when the TOF cell arrives, "DIS_FLAG" remains "false". Thus, when the TOF cell arrives, the frame process unit 33 does not output an instruction to compulsorily discard the arrived cell.

The UPC process unit 31 checks whether the arrived TOF cell is conforming. If the TOF cell is a conforming cell, the UPC process unit 31 outputs a signal which indicates that "UPC_DIS"="false".

Since if the TOF cell is a conforming cell, both "DIS_FLAG" and "UPC_DIS" are "false", the judgment results in steps S61 and S64 both become "No". Therefore, the frame process unit 33 outputs a signal which indicates that "UPC_DIS"="false" to the cell process unit 35 by the process in the flowchart shown in FIG. 12. If a TOF cell arrives, the judgment result in step S81 becomes "No", and "1" is written in "TOF".

When an MOF cell arrives following the TOF cell, the process in the flowchart shown in FIG. 9 is executed for the MOF cell. In this case, since if the TOF cell is a conforming cell, both "W_DIS" and "P_DIS" are "false", step S45 is not executed and step S13 is executed. Thus, the frame process unit 33 does not output an instruction to compulsorily discard the arrived MOF cell.

When an EOF cell arrives following one or more of MOF cells, the process in the flowchart shown in FIG. 9 is executed for the EOF cell. In this case, if all the TOF cell and MOF cells are conforming cells, both "W_DIS" and "P_DIS" are "false", step S45 is not executed and step S13 is executed. And, the frame process unit 33 does not output an instruction to compulsorily discard the arrived EOF cell. Actually, when the EOF cell arrives, the judgment result in step S32 is "Yes", and step S36 is executed. Therefore, for example, even if "P_DIS" is "true" since the MOF cell is discarded, an instruction to compulsorily discard the arrived EOF cell is not outputted since the parameter ("P_DIS") is updated.

AS described above, if the arrived TOF cell is a conforming cell, the frame process unit 33 does not output an instruction to compulsorily discard the TOF cell, MOF cells or EOF cell. Therefore, the cell process unit 35 transmits the arrived cell to a network without discarding it. However, even when the TOF cell is a conforming cell, if one of the MOF cells is discarded, instructions to compulsorily discard the subsequent MOF cells are outputted. This process is described later.

When a TOF Cell is a Non-conforming Cell

If a TOF cell is a non-conforming cell and is discarded, a receiving terminal cannot reproduce an AAL5 frame. Thus, when a TOF cell in which the top portion of the AAL5 frame is stored is discarded, if cells in which other data sets obtained from the AAL5 frame are stored are transmitted to the receiving terminal, network resources are wasted. Therefore, if a TOF cell in which the top portion of a certain AAL5 frame is stored is discarded, the UPC device of this preferred embodiment compulsorily discards the cells (including both MOF cells and an EOF cell) in which other data sets obtained from the AAL5 frame are stored. The operation of the UPC device in the case where an arrived TOF cell is a non-conforming cell is described below with reference to the flowcharts shown in FIGS. 9 and 12.

Even if the arrived cell is a non-conforming cell, the result of the process in the flowchart shown in FIG. 9 is the same as that in the case where the TOF cell is a conforming cell. That is to say, the frame process unit 33 does not output an instruction to compulsorily discard the arrived TOF cell.

If the arrived TOF cell is a non-conforming cell, the UPC process unit 31 outputs a signal which indicates that "UPC_DIS"="true". In this case, if the process in the flowchart shown in FIG. 12 is executed, the judgment result in step S64 becomes "Yes", the judgment result in step S65 becomes "Yes", and step S66 is executed. As a result, "true" is written in "W_DIS".

If MOF cells and an EOF cell arrive following the TOF cell, the process in the flowchart shown in FIG. 9 is executed for each of those cells. In this case, if the TOF cell is a non-conforming cell, the judgment result in step S41 becomes "Yes" for all the MOF and EOF cells since "W_DIS" is "true", and then step S45 is executed. As a result, a signal which indicates that "DIS_FLAG"="true" is outputted for all the MOF and EOF cells. Thus, an instruction to compulsorily discard each of the MOF and EOF cells is outputted.

Furthermore, the process in the flowchart shown in FIG. 12 is executed for each of the MOF cells and the EOF cell. In this case, a signal which indicates that "DIS_FLAG"="true" is outputted by the process in the flowchart shown in FIG. 9, and when the TOF cell arrives, "true" is written in "W_DIS". Therefore, the judgment results in both steps S61 and S62 become "Yes", and step S63 is executed. Thus, "UPC_DIS" for the MOF cell and the EOF cell becomes "true", regardless of the judgment result of the UPC process unit 31. As a result, the cell process unit 35 discards all the MOF and EOF cells.

As described above, if the arrived TOF cell is a non-conforming cell, the frame process unit 33 outputs an instruction to compulsorily discard each MOF cell and an EOF cell following the TOF cell. As a result, all the cells related to one AAL5 frame are discarded.

If an EOF cell arrives, step S82 is executed, and "W_DIS" is reset for a next AAL5 frame. For example, if a cell A1 is discarded in FIG. 14, the UPC device compulsorily discards cells A2 through An. In this case, when cell An is processed, "false" is written in "W_DIS". Therefore, when a cell in which the next AAL5 frame is stored arrives, the UPC device executes normal operation.

As described above, when controlling the traffic of a connection in which a GFR service is provided, the UPC device in this preferred embodiment discards cells in units of AAL5 frames.

When an MOF Cell is a Non-conforming Cell

If one or more MOF cells are discarded, even when a TOF cell is correctly transmitted, a receiving terminal cannot reproduce an AAL5 frame. Thus, when a MOF cell relating to an AAL5 frame is discarded, if subsequent cells in which data sets obtained from the AAL5 frame are stored are transmitted to the receiving terminal, network resources are wasted. Therefore, when discarding a MOF cell relating to a specific AAL5 frame, the UPC device in this preferred embodiment compulsorily discards cells following the MOF cell.

However, if the TOF cell is not discarded, the receiving terminal tries to reproduce one AAL5 frame from data sets which are extracted from all cells between and including the TOF cell and a first subsequent EOF cell. Therefore, for example, in FIG. 14, if cells A3 through An are compulsorily discarded due to discard of cell A2, the receiving terminal tries to reproduce one AAL5 frame from data sets which are extracted from cells A1 through Bn (excluding cells A2 through An). In this case, the AAL5 frame cannot be correctly reproduced. And, in this example, even if all cells relating to AAL5 frame (B) are transmitted to the receiving terminal, the receiving terminal cannot reproduce the AAL5 frame (B).

To avoid this situation, even if an MOF is discarded, when a TOF cell has not been discarded, the UPC device in this preferred embodiment does not generate an instruction to compulsorily discard an EOF cell. The operation of the UPC device in the case where an arrived MOF cell is a non-conforming cell is described below with reference to the flowcharts shown in FIGS. 9 and 12. Here, it is assumed that a TOF cell is a conforming cell.

If a certain MOF cell (hereinafter assumed to be an MOF cell A2 shown in FIG. 14) is a non-conforming cell, the UPC process unit 31 outputs a signal which indicates that "UPC_DIS"="true". In this case, in the process in the flowchart shown in FIG. 12, the judgment result in step S64 becomes "Yes". Since when the MOF cell arrives, both "TOF" and "EOF" are "0", the judgment result in step S67 becomes "Yes". As a result, "true" is written in "P_DIS". Once "true" is written in "P_DIS", the value is maintained until an EOF cell arrives.

Then, MOF cells A3 through An-1 arrive in order. The judgment result in step S43 becomes "Yes" for each of these cells. Therefore, step S45 is executed, and instructions to compulsorily discard the MOF cells A3 through An-1 are generated. If these instructions are outputted, the cell process unit 35 discards the MOF cells A3 through An-1 regardless of the judgment result of the UPC process unit 31.

Then, if an EOF cell arrives, step S36 is executed, and "P_DIS"is reset. If the TOF cell is a conforming cell, "W_DIS"="false". Therefore, the judgment results in both steps S41 and S43 become "No", step S45 is not executed, and step S13 is executed. Thus, an instruction to compulsorily discard an arrived cell is not outputted for the arrived EOF cell. Therefore, the cell process unit 35 does not discard this EOF cell, but transmits it to a network.

As described above, even if an MOF is discarded when a TOF cell is not discarded, the UPC device in this preferred embodiment does not discard an EOF cell, but transmits it to a network.

If the EOF is a non-conforming cell, the UPC process unit 31 outputs a signal which indicates that "UPC_DIS"= "true". Therefore, in this case, the EOF cell is discarded.

However, if a first step for confirming that "W_DIS"= "false", a second step for confirming that an arrived cell is an EOF cell, and a third step for compulsorily changing "UPC_DIS" to "false" if the conditions in the first and second steps are met are provided immediately before step S64, then the EOF cell is not discarded, when the TOF cell is not discarded and EOF cell is a non-conforming cell. By providing such steps, the above-described problem (in that if one of a plurality of data sets obtained from a specific AAL5 frame is discarded, an AAL5 frame following the specific AAL5 frame cannot be reproduced) can be avoided.

As described above, when controlling the traffic of a connection in which a GFR service is provided, the UPC device in this preferred embodiment discards cells in units of AAL5 frames. Although in the above-described example, the process of discarding cells is described, the same process basically applies to the process of performing tagging for cells.

A cell passing through the UPC device (cells which is not discarded by the UPC device) is inputted to an ATM switch 10 shown in FIG. 4. The ATM switch is usually provided with a buffer for temporarily storing the inputted cell.

FIG. 15 shows a configuration of a cell buffer device which an ATM switch is provided with. The buffer device is provided with QoS buffers #1 through #N for storing cells for each service category. It is assumed in FIG. 15 that a QoS buffer #N corresponds to a GFR service.

A QoS judgment unit 51 detects the service category of an inputted cell and writes the cell in a corresponding QoS buffer. The service category of each cell can be judged from VPI/VCI which is stored in the header of the cell or from tag information shown in FIG. 16. "Tag information" referred to here is information which is used only inside the ATM switch and is chiefly composed of routing information in the ATM switch, etc. Since this tag information is not standardized, it is easy to include information for indicating its service category in it.

A read control unit 52 reads cells from QoS buffers #1 through #N according to a priority order which is set for each service category.

In each QoS buffer, three thresholds are set to judge their traffic conditions. A threshold Max indicates the size of a buffer. A threshold H is used to detect a congestion. Thus, if the number of cells which are stored in the buffer exceeds the threshold H, it is judged that the network is congested. A threshold L is used to judge whether the network is recovered from the congestion. Thus, if the number of cells which are stored in the buffer is below the threshold L after a congestion has occurred, the traffic control for congestion is terminated.

If a congestion is detected, QoS buffers #1 through #N report the fact to a discard unit 53. Upon receiving the notice, the discard unit 53 discards a cell with low priority among cells stored in a corresponding QoS buffer which outputs the notice. Thus, a cell with "CLP=1" is discarded.

If a congestion is occurred in a GFR service, QoS buffer #N reports the fact not only to the discard unit 53 but to the frame process unit 54. The frame process unit 54 executes the processes in the flowcharts shown in FIGS. 9 and 12. Thus, if a cell in which the top portion of an AAL5 frame is stored is discarded by the discard unit 53, the frame process unit 54 outputs to the discard unit 53 an instruction to compulsorily discard all cells in which other data sets obtained from the AAL5 frame are stored. If a cell in which the middle portion of the AAL5 frame is stored is discarded by the discard unit 53, the frame process unit 54 issues an instruction to the discard unit 53 to compulsorily discard subsequent cells in which other data sets obtained from the AAL5 frame are stored. In this case, a cell in which an end portion of the AAL5 frame is stored is excepted. The frame process unit 54 executes the process in the flowchart shown in FIG. 12 while recognizing the output of QoS buffer #N as "DIS_FLAG" generated by the UPC process unit 31.

As described above, when a network is congested, a cell which passes through the UPC device 30 may be discarded in the ATM switch if it is a cell for which tagging is performed by the UPC device 30 (cell in which CLP=1). Thus, as a rule, cells which pass through without being tagged in the UPC device 30 are not discarded in the ATM switch 10. Therefore, if MCR (Minimum Cell Rate) is set as a parameter which is used in a virtual scheduling algorithm executed in the UPC process unit 31, instead of SCR, a band assigned according to the MCR is guaranteed for a GFR service, even if a congestion is occurred in an ATM switch, etc.

Although in the above-described example, the UPC device judges whether there is non-conformity with a declared parameter according to a virtual scheduling algorithm, it can also judge the non-conformity according to a leaky bucket algorithm.

Although in the above-described example, a configuration in which an AAL5 frame is divided into a plurality of data sets, the data sets are stored in different ATM cells and the transmission of data sets using a GFR service is described as an example, the present invention is not limited to this aspect. The present invention can also be applied to a system in which a frame or packet specified in a layer higher in order than an ATM layer is divided into a plurality of data sets, the data sets are stored in different ATM cells and the data sets are transmitted.

According to the present invention, since cells are discarded in units of frames which are specified in a layer higher in order than a layer in which fixed-length packets are specified, in a fixed-length packet network, the unnecessary transmission of cells can be avoided, thereby reducing the waste of network resources.

Since the above-described operation can be realized only by adding a function to execute a process in units of frames to the conventional UPC device, transition from the conventional device to the device of the present invention should be relatively easy.

Moreover, if the device of the present invention is installed, a GFR service can be realized only by discarding a fixed-length packet with a low priority in switching equipment when a congestion is occurred.

What is claimed is:

1. A traffic, control apparatus for controlling traffic of a packet in a network where packets are transmitted, comprising:

judging means for generating a non-conformity notice when an interval between packets does not conform to a predetermined parameter;

determining means, when a non-conformity notice is generated by said judging means for a first packet in which one of a plurality of data sets from a frame is stored, for determining whether or not to generate a non-conformity notice for a second packet in which a second data set obtained from the same frame is stored, based on a position in the frame of the data set stored in the first packet for which the non-conformity notice is generated; and processing means for discarding a packet for which a non-conformity notice is generated, or for setting a low priority for a packet for which a con-conformity notice is generated.

2. The traffic control apparatus according to claim 1, wherein when a non-conforming notice is generated for a packet in which a top portion of the frame data is stored by said judging means, said determining means generates a non-conformity notice for all packets in which other data sets obtained from the frame data are stored.

3. The traffic control apparatus according to claim 1, wherein when a non-conformity notice is generated for a packet in which a middle portion of the frame data is stored by said judging means, said determining means generates non-conformity notices for packets following the packet for which the non-conforming notice has been generated by said judging means among packets in which other data sets obtained from the frame data are stored except for a packet in which an end portion of the frame data is stored.

4. The traffic control apparatus according to claim 1, further comprising:

notice modifying means for cancelling the non-conformity notice when a non-conforming notice is generated for a packet in which an end portion of the frame data is stored by said judging means.

5. The traffic control apparatus according to claim 1, further comprising:

parameter changing means for changing parameters which are used by said judging means when receiving a packet in which a top portion of the frame data is stored.

6. The traffic control apparatus according to claim 1, wherein said judging means judges whether or not there is non-conformity according to a virtual scheduling algorithm or a leaky bucket algorithm.

7. A traffic control apparatus for controlling traffic of a packet in a network where packets are transmitted, comprising:

a generator for generating an instruction when an interval between packets does not conform to a predetermined parameter;

a detector, when the instruction is generated by said generator for a first packet in which one of a plurality of data sets from a frame is stored, for detecting a second packet in which another data set from the frame is stored; and a controller for discarding the second packet or giving a low priority to the second packet.

8. A traffic control apparatus for controlling traffic of a service which transmits packets, each of the packets storing one of a plurality of data sets obtained by dividing frame data of a layer higher in order than a layer specifying the packet, said apparatus comprising:

judging means for judging whether or not an interval between packets conforms to a predetermined parameter;

changing means for changing a judgment result of said judging means for a plurality of packets in which a plurality of data sets obtained from the data frame are stored in units of the data frame; and processing means for discharging a packet or setting a low priority for a packet according to the changed judgement result.

9. A packet switching system for transmitting packets, comprising:

a traffic control apparatus, including:

generating means for generating a non-conformity notice when an interval between packets does not conform to a predetermined parameter;

determining means, when a non-conformity notice is generated by said generating means for a first packet in which one of a plurality of data sets from a frame is stored, for determining whether or not to generate a non-conformity notice for a second packet in which a second data set obtained from the same frame data is stored, based on a position in the frame of the data set stored in the first packet for which the non-conformity notice is generated; and processing means for discarding a packet for which a non-conforming notice is generated, or for setting a low priority for a packet for which a non-conformity notice is generated, and a buffer device, including:

a buffer for storing packets passing through the packet control apparatus; and discarding means for discarding a packet to which a low priority is set when the network is congested.

10. A traffic control method for controlling traffic of a packet in a network where packets are transmitted, comprising the steps of:

generating a non-conformity notice when an interval between packets does not conform to a predetermined parameter;

determining, when a non-conformity notice is generated for a first packet in which one of a plurality of data sets from a frame is stored, whether or not to generate a non-conformity notice for a second packet in which a second data set obtained from the same frame is stored, based on a position in the frame of the data set stored in the first packet for which the non-conformity notice is generated; and performing at least one of discarding a packet for which a non-conformity notice is generated or setting a low priority for a packet for which a non-conformity notice is generated.

* * * * *